United States Patent
Choi et al.

(10) Patent No.: US 8,385,488 B2
(45) Date of Patent: Feb. 26, 2013

(54) INTER-CELL INTERFERENCE MITIGATION METHOD USING SPATIAL COVARIANCE MATRIX ESTIMATION METHOD FOR INTER-CELL INTERFERENCE MITIGATION OF MIMO ANTENNA OFDM SYSTEM

(75) Inventors: Hyung-Jin Choi, Seoul (KR); Jun-Hee Jang, Gyeonggi-do (KR); Jung-Su Han, Gyeonggi-do (KR)

(73) Assignee: SUNGKYUNKWAN UNIVERSITY Foundation for Corporate Collaboration, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/319,691

(22) PCT Filed: Sep. 15, 2009

(86) PCT No.: PCT/KR2009/005233
§ 371 (c)(1),
(2), (4) Date: Nov. 10, 2011

(87) PCT Pub. No.: WO2010/131818
PCT Pub. Date: Nov. 18, 2010

(65) Prior Publication Data
US 2012/0063529 A1 Mar. 15, 2012

(30) Foreign Application Priority Data

May 11, 2009 (KR) .................. 10-2009-0040786

(51) Int. Cl.
*H04B 7/10* (2006.01)
*H04L 1/02* (2006.01)
(52) U.S. Cl. ......... 375/347; 375/316; 375/346; 455/312
(58) Field of Classification Search .................. 375/347
See application file for complete search history.

(56) References Cited

U.S. PATENT DOCUMENTS
(Continued)

FOREIGN PATENT DOCUMENTS

| KR | 10-2008-0083978 A | 9/2008 |
| KR | 10-2008-0098610 A | 11/2008 |
| WO | 01/03396 A2 | 1/2001 |
| WO | 2008/043088 A1 | 4/2008 |

OTHER PUBLICATIONS

International Search Report w/translation from PCT/KR2009/005233 dated Apr. 26, 2010 (4 pages)

(Continued)

*Primary Examiner* — Erin File
(74) *Attorney, Agent, or Firm* — Osha Liang LLP

(57) ABSTRACT

Disclosed is an inter-cell interference mitigation method using a spatial covariance matrix (SCM) estimation method in a multi-input multi-output (MIMO) orthogonal frequency division multiplexing (OFDM) communication system for mitigating interference between asynchronous cells. The inter-cell interference mitigation method includes extracting a reference symbol (RS) of a received OFDM symbol and performing channel estimation, estimating an initial SCM using the RS signal and the channel estimation result, applying time-domain sinc type weighting to the initial SCM and applying an SCM, and demodulating a data symbol with mitigated inter-cell interference using the channel estimation result and the estimated SCM. By applying time-domain sinc type weighting to SCM estimation, it is possible to reduce an SCM estimation error occurring due to a spectral leakage induced by an abrupt change in a signal at a border point between an effective sub carrier zone and a guard band zone, and a simple design of a moving average filter form for a frequency domain signal can be made instead of frequency-time-frequency domain transformation using an inverse fast Fourier transform (IFFT) and fast Fourier transfer (FFT).

18 Claims, 17 Drawing Sheets

U.S. PATENT DOCUMENTS

| | | | |
|---|---|---|---|
| 7,606,138 B2 * | 10/2009 | Wang et al. | 370/210 |
| 2005/0195915 A1 * | 9/2005 | Raleigh et al. | 375/267 |
| 2008/0232488 A1 | 9/2008 | Sandell et al. | |
| 2010/0091906 A1 * | 4/2010 | Raleigh et al. | 375/299 |
| 2010/0238984 A1 * | 9/2010 | Sayana et al. | 375/219 |
| 2011/0085610 A1 * | 4/2011 | Zhuang et al. | 375/260 |
| 2012/0115520 A1 * | 5/2012 | Rossel et al. | 455/501 |
| 2012/0182857 A1 * | 7/2012 | Bertrand et al. | 370/210 |
| 2012/0243502 A1 * | 9/2012 | Lindqvist et al. | 370/330 |

OTHER PUBLICATIONS

KIPO abstract Publication No. 1020080083978A dated Sep. 19, 2008 (1 page).

KIPO abstract Publication No. 1020080098610A dated Nov. 11, 2008 (1 page).

* cited by examiner

INTER-CELL INTERFERENCE MITIGATION METHOD USING SPATIAL COVARIANCE MATRIX ESTIMATION METHOD FOR INTER-CELL INTERFERENCE MITIGATION OF MIMO ANTENNA OFDM SYSTEM

BACKGROUND

1. Technical Field

The present invention relates to an orthogonal frequency division multiplexing access (OFDMA) communication system, and more particularly, to an inter-cell interference mitigation method for overcoming reception performance degradation caused by asynchronous inter-cell interference in a multi-input multi-output (MIMO)-OFDMA system in which a multi-cell environment is considered.

2. Related Art

Next-generation mobile communications such as a 3rd Generation Partnership Project (3GPP) long-term evolution (LTE) or a mobile WiMax of IEEE 802.16 commonly employ communication techniques such as a MIMO antenna technique and an OFDMA scheme.

Most of OFDMA schemes have a problem of inter-cell interference (ICI) caused by overlapping of frequency resources between cells since an inter-cell frequency reuse ratio is one (1). The inter-cell interference is more problematic in a cell structure of an asynchronous type in which synchronization between base stations is not required. As a technique of avoiding the inter-cell interference, techniques such as fractional frequency reuse (FFR) are used, and various techniques for inter-cell interference mitigation are applied at the time of receiver design. The present invention relates to an inter-cell interference mitigation method of a receiver for mitigating the inter-cell interference and a receiver design to which the inter-cell interference mitigation method is applied.

In a multi-path fading channel environment in which mobility is considered, a reception signal is greatly influenced by frequency selective fading caused by a multi-path delay of a channel and a Doppler frequency according to an increase in velocity of a moving body. Particularly, when the velocity of a moving body increases and so the Doppler shift gets deepened, a change of a channel increases even in one frame due to a decrease in a coherence time. Thus, in order to compensate for influence of a channel, it is necessary to accurately estimate a channel frequency response (CFR) on a reception signal.

In addition, when practical cellular environments such as different cell radiuses and a difference in a distance between base stations are considered, signals of terminals (user equipment (UE)) having different symbol timings are received in an overlapping manner. When asynchronous interference signals overlap each other within a Fast Fourier Transform (FFT) window zone of a receiver, the interference signals destroy orthogonality in a frequency signal domain. Inter-cell interference between asynchronous signals and noise signals are estimated using a spatial covariance matrix (SCM).

A representative SCM estimation technique includes a low pass smoothing (LPS) technique that transforms an initial (instantaneous) SCM estimated in a frequency domain into that in a time domain and then applies low-pass type weighting. By this technique, noise included in an uncorrelated component is removed from a time domain characteristic of an observed SCM, and a maximum noise reduction effect can be obtained.

Let us assume that M transmitting antennas and N receiving antennas are installed. In this case, in an inter-cell interference environment, $M_{ICI}$ inter-cell interference signals are received in a superimposed manner. Thus, a reception signal in a k-th sub carrier of a j-th OFDM symbol in a frequency domain is represented by Formula 1:

$$Y_{k,j}=H_{k,j}X_{k,j}+G_{k,j}U_{k,j}+W_{k,j}=H_{k,j}X_{k,j}+I_{k,j} \quad \text{Formula 1}$$

Here, a reception signal vector $Y_{k,j}$, a transmission signal vector $X_{k,j}$, a channel coefficient matrix $H_{k,j}$ for a transmission signal, an asynchronous inter-cell interference signal vector $U_{k,j}$, a channel coefficient matrix $G_{k,j}$ for the asynchronous inter-cell interference signal vector, and a noise vector $W_{k,j}$ having an average of "0" and a variance of σ2 are represented by Formula 2 in view of the transmitting and receiving antennas. In Formula 1, $I_{k,j}$ may be represented by the sum of the asynchronous inter-cell interference and noise.

$$\begin{bmatrix} Y_{k,j}^1 \\ Y_{k,j}^2 \\ \vdots \\ Y_{k,j}^N \end{bmatrix} = \begin{bmatrix} H_{k,j}^{1,1} & H_{k,j}^{1,2} & \cdots & H_{k,j}^{1,M} \\ H_{k,j}^{2,1} & H_{k,j}^{2,2} & \cdots & H_{k,j}^{2,M} \\ \vdots & \vdots & \ddots & \vdots \\ H_{k,j}^{N,1} & H_{k,j}^{N,2} & \cdots & H_{k,j}^{N,M} \end{bmatrix} \begin{bmatrix} X_{k,j}^1 \\ X_{k,j}^2 \\ \vdots \\ X_{k,j}^M \end{bmatrix} + \quad \text{Formula 2}$$

$$\begin{bmatrix} G_{k,j}^{1,1} & G_{k,j}^{1,2} & \cdots & G_{k,j}^{1,M_{ICI}} \\ G_{k,j}^{2,1} & G_{k,j}^{2,2} & \cdots & G_{k,j}^{2,M_{ICI}} \\ \vdots & \vdots & \ddots & \vdots \\ G_{k,j}^{N,1} & G_{k,j}^{N,2} & \cdots & G_{k,j}^{N,M_{ICI}} \end{bmatrix} \begin{bmatrix} U_{k,j}^1 \\ U_{k,j}^2 \\ \vdots \\ U_{k,j}^{M_{ICI}} \end{bmatrix} + \begin{bmatrix} W_{k,j}^1 \\ W_{k,j}^2 \\ \vdots \\ W_{k,j}^N \end{bmatrix}$$

If it is assumed that the CFR (i.e., the channel coefficient matrix) for the reception signal can be perfectly ideally estimated like the conventional SCM estimation technique, in SCM estimation for removing and mitigating the asynchronous inter-cell interference, an initial SCM may be calculated using an OFDM symbol allocated a preamble or a training sequence by Formula 3. Generally, an SCM for the k-th sub carrier of the j-th OFDM symbol is obtained by averaging $I_{k,j}$ that is the sum of the asynchronous inter-cell interference and noise by P reception OFDM symbols by Formula 4.

$$R_{k,j}^{II} = (Y_{k,j} - H_{k,j}X_{k,j})(Y_{k,j} - H_{k,j}X_{k,j})^H, \quad \text{Formula 3}$$
$$0 \le k \le K-1$$

$$R_k^{II} = E[R_{k,j}^{II}] \quad \text{Formula 4}$$
$$= \frac{1}{P} \lim_{P \to \infty} \sum_{j=0}^{P-1} [R_{k,j}^{II}]$$
$$= \frac{1}{P} \lim_{P \to \infty} \sum_{j=0}^{P-1} [(Y_{k,j} - H_{k,j}X_{k,j})(Y_{k,j} - H_{k,j}X_{k,j})^H]$$
$$= \frac{1}{P} \lim_{P \to \infty} \sum_{j=0}^{P-1} [(I_{k,j})(I_{k,j})^H],$$

where P represents the number of symbols of the training sequence.

In the case of the multi-path channel in which mobility is considered, a characteristic of an SCM that changes with respect to each OFDM symbol is lost in the process of applying an average as in Formula 4, and thus the performance for removing and mitigating the inter-cell interference that changes every moment degrades. As a method of compensating for this influence, the conventional LPS technique applies time-domain low-pass type weighting in order to obtain a noise reduction effect for the initial SCM instead of taking an average as in Formula 4.

A description will be made below in connection with the LPS-based SCM estimation technique and a structure of a conventional inter-cell interference mitigation receiving apparatus to which the LPS-based SCM estimation technique is applied.

FIG. 1 is a block diagram for explaining a configuration a MIMO-OFDM inter-cell interference mitigation receiving apparatus according to a conventional art.

FIG. 1 shows a MIMO-OFDM receiver having a receiver structure to which an LPS based SCM estimating algorithm is applied.

In N receiving units 110, after a cyclic prefix (CP) is removed from a signal in a time domain, a reference symbol (RS) signal extraction unit 111 separates a preamble or a training sequence allocated to each antenna from a reception signal in a frequency domain that has been subjected to a FFT process, and provides the preamble or the training sequence to an SCM estimation unit 120. The SCM estimation unit 120 receives $H_{k,j}$ estimated by a channel estimation unit (not shown in FIG. 1) and calculates an initial SCM $R_{k,j}^{\pi}$ by Formula 3. More specifically, FIG. 1 shows that the initial SCM is calculated by an initial SCM estimation unit 121 installed in the SCM estimation unit 120.

At this time, when the initial SCM has a transform relation between the frequency domain and the time domain as in Formula 5, a weighting vector $d_i$ can be applied by Formula 6 for the sake of the noise reduction effect. That is, instead of taking an average as in Formula 4, time-domain low-pass type weighting is applied to the initial SCM as in Formula 6 in order to obtain the noise reduction effect.

$$S_k^{(n,m)} = R_k^{II}[n,m], \text{ where } \begin{cases} m, n = 1, \ldots, N \\ k = 0, \ldots, K-1 \end{cases} \quad \text{Formula 5}$$

$$s_i^{(n,m)} = IFFT_K[S_k^{(n,m)}],$$

where N represents the number of antennas, and K represents the number of sub carriers.

$$\hat{s}_i^{(n,m)} = d_i \cdot s_i^{(n,m)} \quad \text{Formula 6}$$

That is, the conventional LPS technique was considered to obtain the noise reduction effect at the time of SCM estimation for effective sub carrier in the frequency domain by removing an uncorrelated component existing beyond a maximum delay time of a channel from an SCM estimated by considering merely the time-frequency domain transform and a time-domain correlation characteristic of a channel for the initial SCM as in Formula 7.

$$\hat{S}_k^{(n,m)} = FFT_K[\hat{s}_i^{(n,m)}] = FFT_K[d_i \cdot s_i^{(n,m)}], \quad \text{Formula 7}$$

$$\text{where } d_i = \begin{cases} 1, & |i| \leq L \\ 0, & \text{otherwise,} \end{cases}$$

where L represents a low-pass type weighting tap and is set to detect an effective component on a time-domain component of the initial SCM. L is defined as $L \geq \tau_{max}$ in view of the fact that the time-domain correlation characteristic does not exceed a maximum delay time $\tau_{max}$ due to influence of multi-path delay of a channel.

However, when the LPS technique is independently applied to each of elements of the initial SCM as in Formula 7, the Hermitian and positive definite structure of the SCM is destroyed, and thus the interference mitigation performance degrades. In order to prevent the performance degradation, before the LPS technique is applied, a decomposition process needs to be performed on the initial SCM, and existing reference literatures and inventions have focused on studies on the decomposition technique.

Examples of the decomposition technique used before the LPS technique is applied include a variance-correlation decomposition, a spectral decomposition singular value decomposition (SVD), and a Cholesky decomposition.

Of these, studies on the Cholesky decomposition capable of maintaining, in particular, the Hermitian and positive definite structure of the estimated SCM have been actively conducted.

For example, Formula 8 represents an example of the Cholesky decomposition for an initial SCM $R_{k,j}^{\pi}$ of a 2Tx-2Rx MIMO system. After the LPS technique is applied to each of elements of a U matrix (a square-root of a matrix $R_{k,j}^{\pi}$) that has been subjected to the Cholesky decomposition, a process of regenerating an SCM by Cholesky reconstruction of $(\hat{U})^H(\hat{U})$ is necessary.

$$R_{k,j}^{II} = \begin{bmatrix} R_{k,j}^{II,(1,1)} & R_{k,j}^{II,(1,2)} \\ R_{k,j}^{II,(2,1)} & R_{k,j}^{II,(2,2)} \end{bmatrix} \quad \text{Formula 8}$$

$$= (U)^H(U)$$

$$= \begin{bmatrix} A^* & 0 \\ B^* & C \end{bmatrix} \begin{bmatrix} A & B \\ 0 & C \end{bmatrix}$$

where, $$\begin{cases} A = (R_{k,j}^{II,(1,1)})^* (R_{k,j}^{II,(1,1)}) \\ B = R_{k,j}^{II,(1,2)} / (R_{k,j}^{II,(1,1)})^* \\ C = \sqrt{R_{k,j}^{II,(2,2)} - B^*B} \end{cases}$$

Referring back to FIG. 1, an LPS-based SCM estimation unit 122 installed in the SCM estimation unit 120 includes a Cholesky decomposition unit 122-1 that performs the Cholesky decomposition defined in Formula 8 on the initial SCM received from the initial SCM estimation unit 121, an LPS executing unit 122-2 that applies the LPS technique to each of elements of the U matrix that has been subjected to the Cholesky decomposition, and a Cholesky reconstruction unit 122-3 that performs the Cholesky reconstruction after the LPS technique is applied.

The SCM finally estimated by the SCM estimation unit 120 is input to a data symbol demodulation unit 130. The data symbol demodulation unit 130 demodulates a data symbol with mitigated inter-cell interference using the SCM and the channel estimation result.

Generally, in the OFDMA communication system, in order to reduce interference from an adjacent channel, a guard band (GB) with a zero value, in which information is not transmitted, is allocated to a sub carrier of a high frequency band and a sub carrier of a low frequency band, respectively.

Due to setting of the guard band, only the initial SCM in an effective sub carrier zone can be estimated, and thus Formula 4 can be represented again by Formula 9 and Formula 10.

$$S_k'^{(n,m)} = S_k^{(n,m)} \cdot B_k, \text{ where } B_k = \begin{cases} 1, & |k| \leq \frac{K_u}{2} \\ 0, & \text{otherwise} \end{cases} \quad \text{Formula 9}$$

$$s_i'^{(n,m)} = IFFT_K[S_k'^{(n,m)}] = s_i^{(n,m)} \otimes b_i \quad \text{Formula 10}$$

Here, $K_u$ represents the number of effective sub carriers, and $B_k$ represents an ideal band pass function. At this time, $b_i$ is a K-point inverse fast Fourier transform (IFFT) result of $B_k$ and causes a spectral leakage represented by Formula 11. That is, an abrupt change in a signal at a border point between an effective sub carrier zone and a guard band zone induces a spectral leakage of a time-domain SCM.

$$b_i = IFFT_K[B_K] = \frac{K_u}{K} \frac{\sin(\pi i K_u / K)}{\pi i K_u / K} \quad \text{Formula 11}$$

FIGS. 2A and 2B are conceptual diagrams for explaining the spectral leakage of the time-domain SCM caused due to the presence of the guard band.

Due to the spectral leakage, spectral leakage components 210 appear in an area beyond a maximum delay time, that is, spectral leakage components 210 appear in all samples in the time-domain (see FIG. 2A).

In particular, when a high-order modulation scheme such as an M-ary quadrature amplitude modulation (QAM) is applied, a spectral leakage phenomenon 220 gets deepened (see FIG. 2B), and thus a serious SCM estimation error is generated in the conventional LPS technique.

As described above, the LPS technique used as the SCM estimation method for inter-cell interference mitigation in the MIMO-OFDMA communication system has a problem in that a complicated decomposition process such as the Cholesky decomposition and the reconstruction process are necessary, and the SCM estimation error is generated since the spectral leakage caused by an abrupt change in a signal at the border point between the effective sub carrier zone and the guard band zone is not considered.

SUMMARY

In order to solve the above problems, it is an object of the present invention to provide an inter-cell interference mitigation method using an SCM estimation technique for a MIMO-OFDMA communication system in which the spectral leakage problem caused by an abrupt change in a signal at the border point between the effective sub carrier zone and the guard band zone is considered, and a complicated decomposition technique required in the conventional LPS technique is not required.

In order to achieve the object, an aspect of the present invention provides an inter-cell interference mitigation method using a spatial covariance matrix (SCM) estimation method in a multi-input multi-output (MIMO) orthogonal frequency division multiplexing (OFDM) communication system for mitigating interference between asynchronous cells, including: extracting a reference symbol (RS) of a received OFDM symbol and performing channel estimation; estimating an initial SCM using the RS signal and the channel estimation result; applying time-domain sinc type weighting to the initial SCM and applying an SCM; and demodulating a data symbol with mitigated inter-cell interference using the channel estimation result and the estimated SCM.

In order to achieve the object, another aspect of the present invention provides an inter-cell interference mitigation method, including: extracting a reference symbol (RS) signal of a received OFDM symbol and performing initial channel estimation; estimating an initial SCM using the RS signal and the channel estimation result; demodulating a data symbol of the received OFDM symbol using the initial channel estimation result and the initial SCM and regenerating a transmission signal; revising the initial channel estimation result using the regenerated transmission signal; applying a discrete Fourier transform (DFT)-based channel estimation technique to the revised channel estimation result with respect to a data sub carrier and estimating a final channel estimation result; revising the initial SCM using the final channel estimation result and the regenerated transmission signal; applying time-domain sine type weighting to the revised SCM with respect to the data sub carrier and estimating a final SCM; and demodulating a data symbol with mitigated inter-cell interference using the final channel estimation result and the final SCM.

When the inter-cell interference mitigation method is implemented by applying the SCM estimation method using time-domain sine type weighting according to the present invention, a complicated decomposition technique required in the conventional LPS technique is not required, and an SCM estimation error resulting from the spectral leakage caused by an abrupt change in a signal at the border point between the effective sub carrier zone and the guard band zone can be reduced.

In addition, unlike the conventional LPS technique, the SCM estimation method according to the present invention has an effect of simplifying a design of a receiving apparatus since direct SCM estimation for a frequency-domain signal can be performed using a moving average filter instead of applying sine type weighting after frequency-time domain transform using the IFFT and then performing time-frequency domain transform using the FFT.

BRIEF DESCRIPTION OF DRAWINGS

Example embodiments of the present invention will become more apparent by describing in detail example embodiments of the present invention with reference to the accompanying drawings, in which.

DESCRIPTION OF MAJOR SYMBOL IN THE ABOVE FIGS

Figure 1:
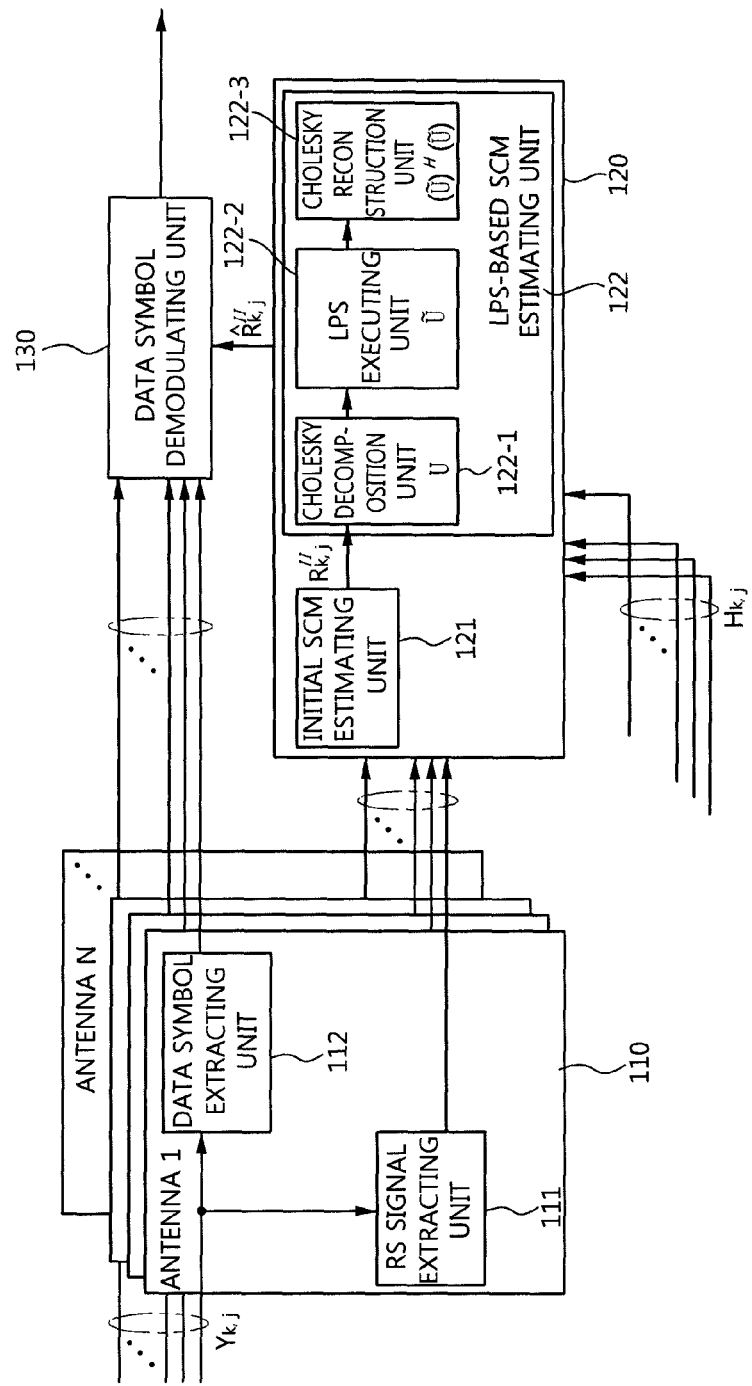
FIG. 1 is a block diagram for explaining a configuration a MIMO-OFDM inter-cell interference mitigation receiving apparatus according to a conventional art.
Figure 2:
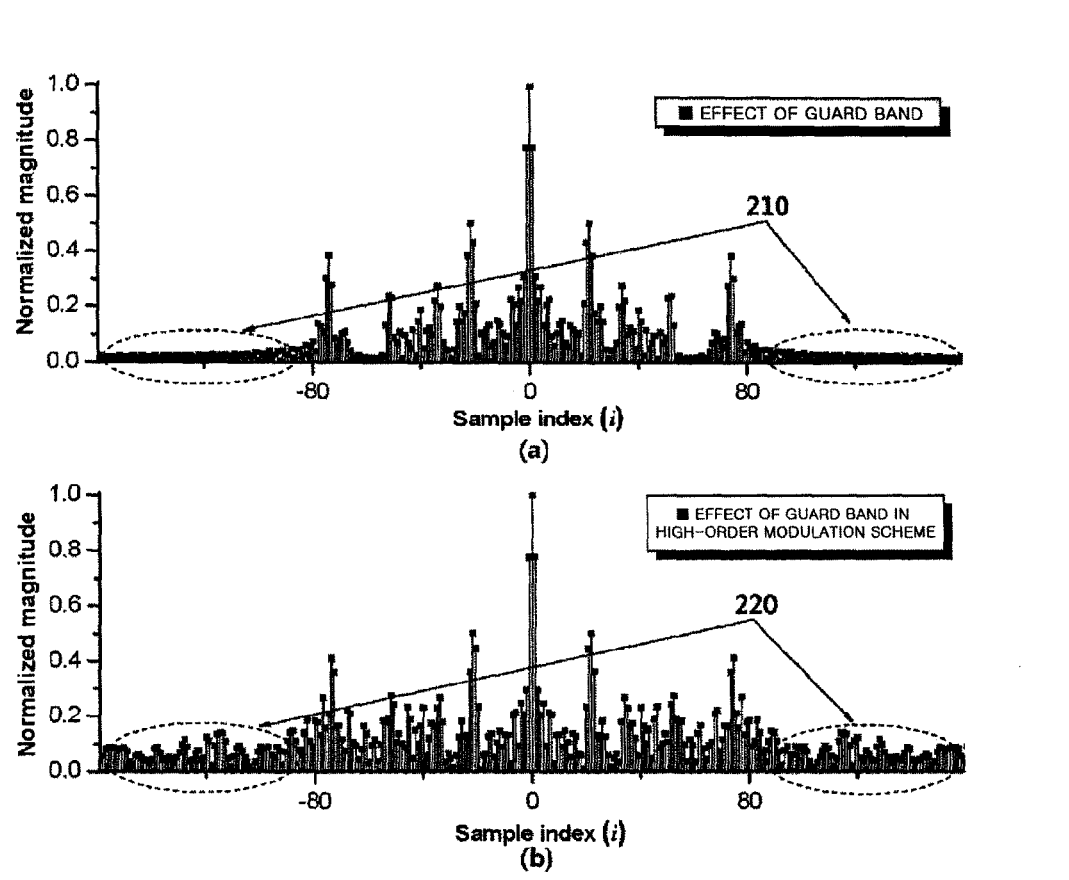
FIGS. 2A and 2B are conceptual diagrams for explaining a spectral leakage of an time-domain SCM caused due to the presence of a guard band.

1110: Receiving unit
1111: RS signal extracting unit
1112: Data symbol extracting unit
1113: Channel estimating unit
1120: SCM estimating unit
1121: Initial SCM estimating unit
1122: Sinc type weighting applying unit
1130: Data symbol demodulating unit

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

SCM Estimation Method According to Present Invention

In an SCM estimation method of the present embodiment, the spectral leakage appearing in all samples in the time domain due to the presence of the guard band is considered, and time domain sinc type weighting is considered to achieve effective noise reduction.

This is based on the fact that the spectral leakage of the SCM is connected with the sinc function as can be seen from Formula 11. The SCM estimation method of the present invention can be represented by Formula 12. A form of the sinc function can be decided by selecting a V value in view of a maximum delay time $\tau_{max}$ of a multi-path channel.

$$\overline{S}_k^{(n,m)} = FFT_K\left[\left(\left|\frac{1}{K}\frac{\sin(\pi iV/K)}{\pi iV/K}\right|\right)\cdot(s_i'^{(n,m)})\right]$$ Formula 12

$$= M_k^a \otimes S_k'^{(n,m)},$$

where $$M_k^a = \begin{cases} \alpha_k(=\text{constant}), & |k| \leq \frac{V}{2}, \frac{K}{V} > \tau_{max} \text{ or } V < \frac{K}{\tau_{max}} \\ 0, & \text{otherwise} \end{cases}$$

$$= \sum_{l=-V/2}^{V/2} M_k^a \cdot S_{k+l}'^{(n,m)}$$

As can be seen from a second formula and a third formula in Formula 12, the improved SCM estimation method of the present invention can be designed in the form of a moving average filter having a V tap in the frequency domain. Thus, when a practical OFDMA system is considered, the improved SCM estimation method of the present invention does not require the additional FFT/IFFT configuration for transformation between the frequency domain and the time domain. In addition, the improved SCM estimation method of the present invention is low in complexity and stable in the performance compared to the conventional SCM estimation algorithm requiring the Cholesky decomposition to maintain the Hermitian and positive definite structure of the SCM.

Figure 3:
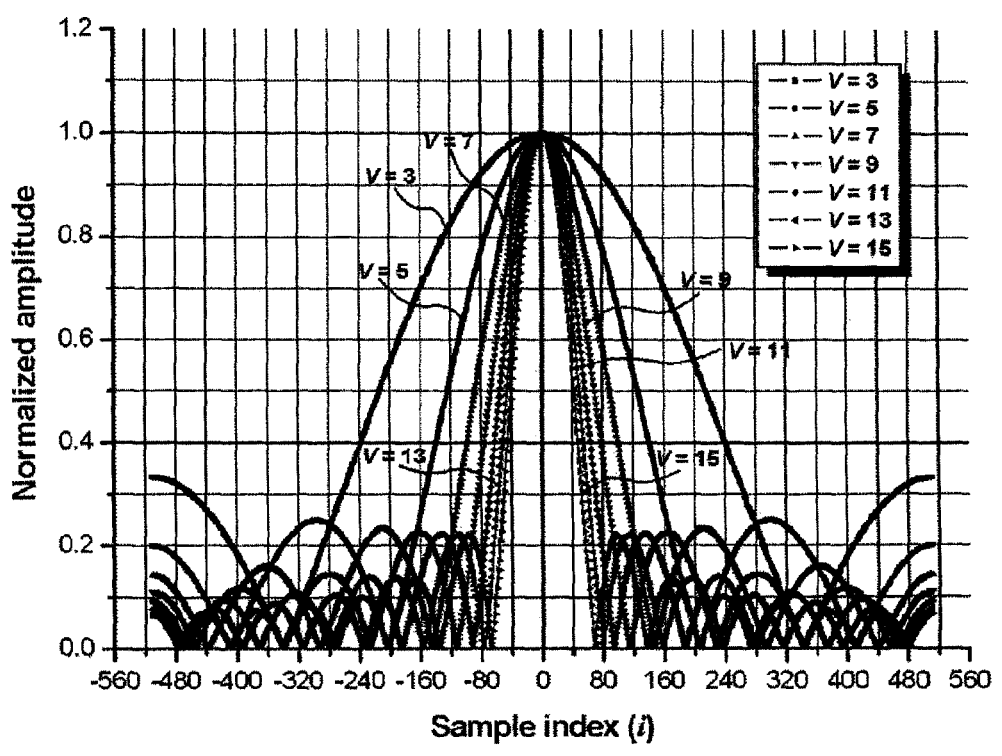
FIG. 3 is a conceptual diagram for explaining time-domain sinc type weighting applied in an SCM estimation method according to the present invention.

FIG. 3 shows a form of the sine function for sine type weighting according to a V value in Formula 12.

In the time-domain sine type weighting, the noise reduction effect is traded off against an SCM leakage loss according the V value. Thus, as shown in FIG. 3, by adjusting the V value, a sine function of an optimum form can be decided so that an efficient noise reduction effect can be achieved while minimizing the amount of spectral leakage.

Generally, in the LPS technique, L is set as the length of a guard interval, and so in the 3GPP LTE system, L is 80. The performance of the proposed sine type weighting technique is evaluated below with reference to V=5, which has the same leakage loss.

Figure 4:
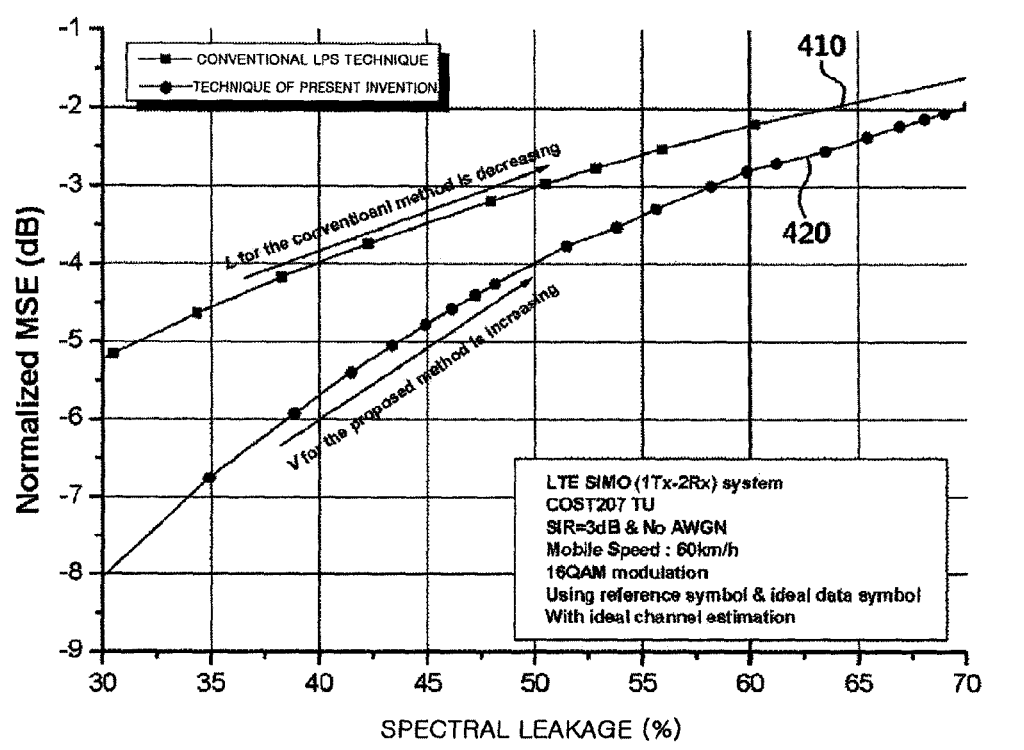
FIG. 4 is a graph illustrating a comparison of normalized means squared error (MSE) performance between a conventional LPS-based SCM estimation method and an SCM estimation method according to the present invention.

FIG. 4 is a graph illustrating a comparison of normalized means squared error (MSE) performance between the conventional LPS-based SCM estimation method and the SCM estimation method according to the present invention.

In FIG. 4, it is assumed that a transmission signal and channel information of the transmission signal are ideally known (ideal channel estimation), and influence of noise is excluded (no adaptive white Gaussian noise (AWGN)).

As can be seen from FIG. 4, as L decreases (410) in the case of the conventional LPS-based SCM estimation method or as the V values increases (420) in the case of the SCM estimation method of the present invention, the amount of leakage loss increases since the spectral leakage present in all samples in the time domain is not reflected, whereby the MSE performance degrades.

However, the SCM estimation technique according to the present invention is more excellent in performance than the conventional LPS-based SCM estimation method.

Application Example of 3GPP LTE MIMO-OFDM System of SCM Estimation Method According to Present Invention Here, a brief description will be made in connection with the 3GPP LTE MIMO-OFDM system to which the SCM estimation method can be applied before the SCM estimation method, an inter-cell interference mitigation method, and a configuration of the inter-cell interference mitigation receiving apparatus according to the present invention are described.

The present invention is more appropriate for the 3GPP LTE MIMO-OFDM system in which the preamble or the training sequence is not allocated than the conventional LPS technique. The following description will be made in connection with the 3GPP LTE MIMO-OFDM system, but it should be noted that applications of the SCM estimation method, the inter-cell interference mitigation method, and the receiving apparatus according to the present invention are not limited to the 3GPP LTE system.

Figure 5:
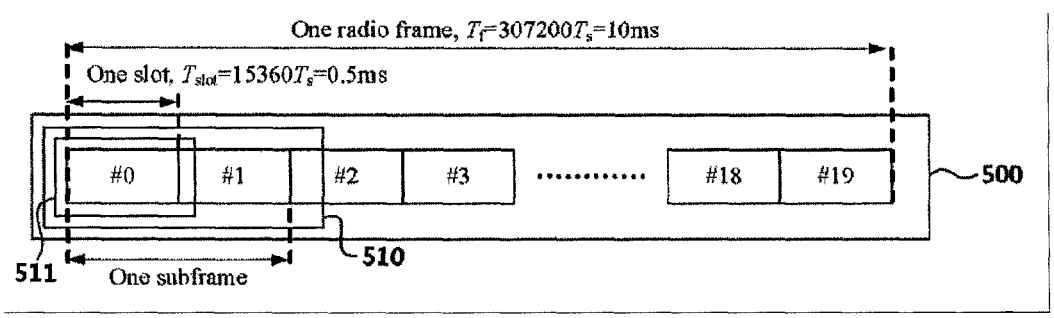
FIG. 5 is a frame structure diagram illustrating a frame structure for a frequency division duplex (FDD) mode of a 3GPP LTE MIMO-OFDM communication system.

FIG. 5 is a frame structure diagram illustrating a frame structure for a frequency division duplex (FDD) mode of the 3GPP LTE MIMO-OFDM communication system.

Referring to FIG. 5, a frame 500 of 10 ms includes 10 sub frames 510, and each sub frame includes two slots 511. In FIG. 5, $T_s$ is represented by Formula 13:

$T_s=1/(\Delta f \times K)$, where $\Delta f$ is subcarrier spacing and $K$ is FFT size  Formula 13

Figure 6:
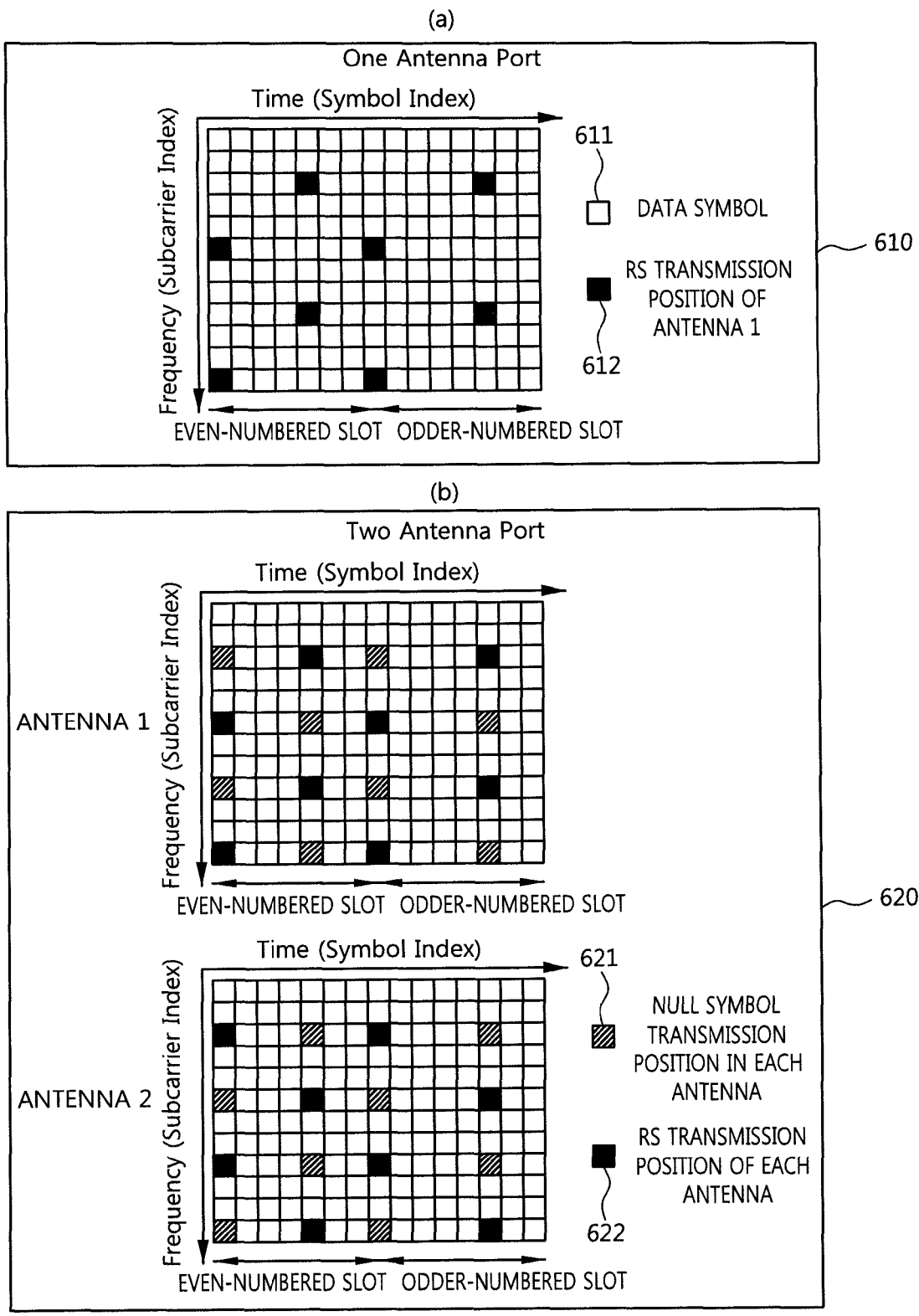
FIGS. 6A and 6B are conceptual diagrams illustrating an example in which reference symbols are allocated in an 3GPP LTE MIMO-OFDMA communication system.

FIGS. 6A and 6B are conceptual diagrams illustrating an example in which reference symbols are allocated in the 3GPP LTE MIMO-OFDMA communication system.

FIGS. 6A and 6B show simplified downlink frame structures specified in the 3GPP LTE TS36.211 document. FIG. 6A shows an example in which the reference symbols are allocated when transmission is performed using one antenna, and FIG. 6B shows an example in which the reference symbols are allocated when transmission is performed using two antennas.

Referring to FIG. 6A, it can be understood that the reference symbols 612 are two-dimensionally arranged in a plane having a frequency axis and a time axis and transmitted using one sub frame as a unit.

Referring to FIG. 6B, the reference symbols are allocated to different sub carriers in a form staggered in the frequency domain according to respective transmitting antennas using six sub carriers as a unit. The reference symbols are located in a first OFDM symbol of each slot and a last third OFDM symbol of each slot.

In particular, when a plurality of transmitting antennas are considered, a null symbol is allocated to be positioned in the same OFDM symbol as the reference symbol in the time axis but to intersect with the reference symbol in the frequency axis while not overlapping the reference symbols (such that the null symbol is allocated to the position of a second antenna corresponding to the position of a first antenna where the reference symbol is transmitted). All of available sub carriers remaining after the reference symbols and the null symbols are allocated may be used as data sub carriers.

The above described SCM estimation method is analyzed using the preamble or the training sequence. However, in the 3GPP LTE MIMO-OFDMA system, it is difficult to estimate the initial SCM as in Formula 3 within a range of all effective sub carriers, and the initial SCM can be calculated only at the position of the RS sub carrier as in Formula 14.

$$R_{k,j}^{II} = \begin{cases} (Y_{k,j} - H_{k,j}X_{k,j})^H(Y_{k,j} - H_{k,j}X_{k,j}), & k \in S_{RS} \\ 0, & k \notin S_{RS} \end{cases}$$ Formula 14 where, $S_P$ = a set of reference symbol index

In the 3GPP LTE MIMO-OFDMA system, even under the assumption that the receiver perfectly knows information of the multi-path channel about the transmission signal and can perfectly separate $I_{k,j}$, which is a component of interference and noise, from the reception signal, an aliasing effect occurs due to time-domain characteristics of the initial SCM as in Formula 14, leading to degradation of the SCM estimation performance.

Figure 7:
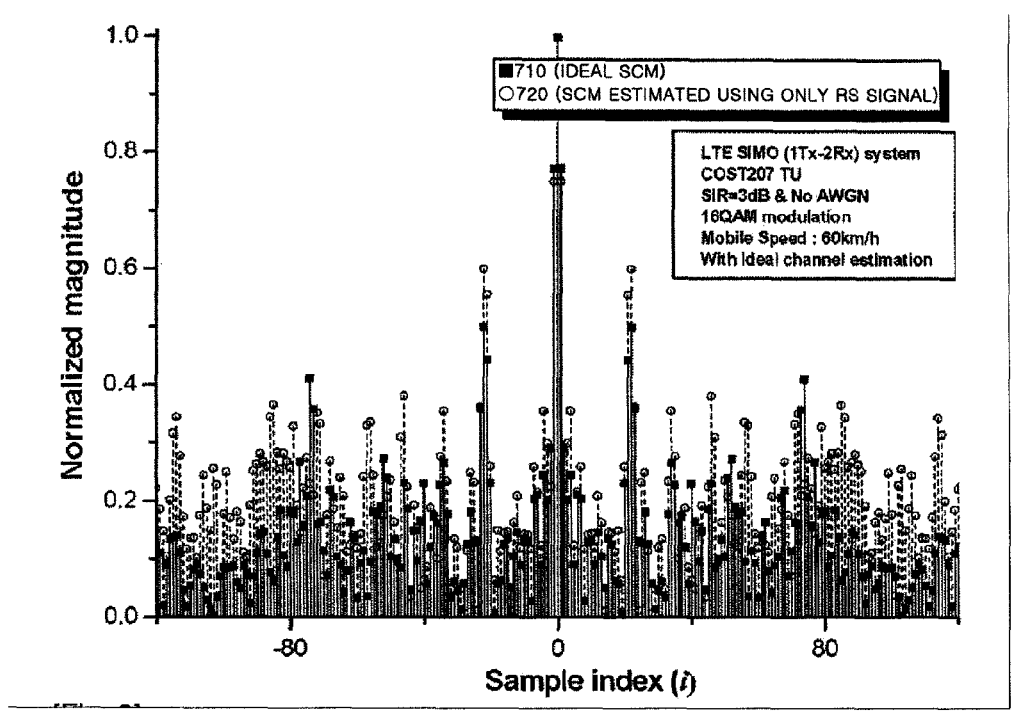
FIG. 7 is a graph illustrating an aliasing effect of an initial SCM in a 3GPP LTE system.

FIG. 7 is a graph illustrating an aliasing effect of the initial SCM in the 3GPP LTE system.

FIG. 7 shows an aliasing effect obtained by comparing a case 710 of assuming that the initial SCM can be calculated in all effective sub carriers with a case 720 in which the initial SCM can be calculated only in the sub carrier where the reference symbol is present. The difference between both cases (710 and 720) caused due to aliasing means degradation of the SCM estimation performance as described above.

Thus, the aliasing effect occurring at the time of SCM estimation needs be removed by applying an interpolation technique in the frequency axis or the time axis as in Formula 15. In Formula 15, two-dimensional (2D) interpolation is performed such that frequency-axis interpolation is performed using the initial SCM value on the sub carrier where the reference symbol signal is present, and then time-axis interpolation is sequentially performed.

$$R''^{II}_{N_f \cdot k + \beta_1, j} =$$ Formula 15

$$R^{II}_{N_{RS_f} \cdot k, j}\left(1 - \frac{\beta_1}{N_f}\right) + R^{II}_{(k+1) \cdot N_{RS_f} \cdot j}\left(\frac{\beta_1}{N_f}\right) : \text{Frequency}$$

$$R'''^{II}_{k, N_t \cdot j + \beta_2} = R''^{II}_{k, N_{RS_t} \cdot j}\left(1 - \frac{\beta_2}{N_t}\right) + R''^{II}_{k, (j+1) \cdot N_{RS_t}}\left(\frac{\beta_2}{N_t}\right) : \text{Time}$$

where $\beta_1 = 0, 1, \ldots, N_f - 1, \beta_2 = 0, 1, \ldots, N_t - 1,$

In view of Formulas 7, 12, and 15, the conventional SCM estimation method and the SCM estimation method according to the present invention in the 3GPP LTE MIMO-OFDMA system can be represented by Formula 16.

$$\hat{R}^{II}_k = \begin{bmatrix} \hat{S}^{(1,1)}_k & \cdots & \hat{S}^{(1,N)}_k \\ \vdots & \ddots & \vdots \\ \hat{S}^{(N,1)}_k & \cdots & \hat{S}^{(N,N)}_k \end{bmatrix},$$ Formula 16 where $$\hat{S}^{(n,m)}_k =$$

$$\begin{cases} FFT_K[d_i \cdot IFFT_K[R''^{II}_k[n,m]]] : \text{Conventional method} \\ \sum_{l=-V/2}^{V/2} M^a_k \cdot R'''^{II}_{k+l}[n,m] : \text{Proposed method} \end{cases}$$

Figure 8:
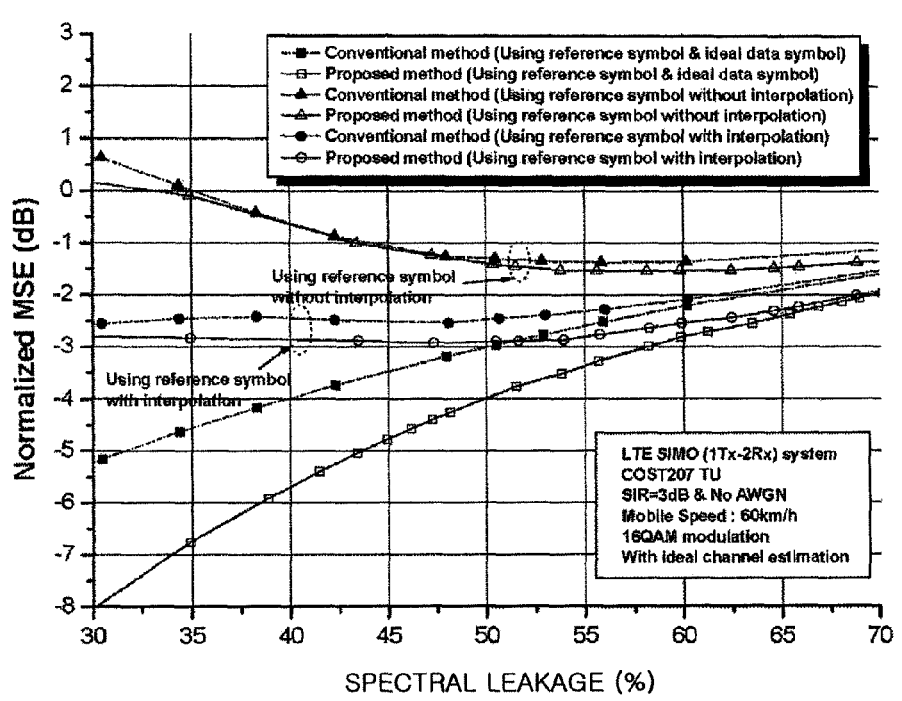
FIG. 8 is a graph illustrating a comparison of normalized MSE performance between a conventional LPS-based estimation method and an SCM estimation method according to the present invention in a 3GPP LTE MIMO-OFDMA system.

FIG. 8 is a graph illustrating a comparison of normalized MSE performance between the conventional LPS-based estimation method and the SCM estimation method according to the present invention in the 3GPP LTE MIMO-OFDMA system.

In FIG. 8, similarly to FIG. 4, it is assumed that the channel information of the transmission signal can be ideally known, and influence of noise is excluded. As can be seen from FIG. 8, the performance of the SCM estimation technique degrades due to the aliasing effect, the MSE performance is improved by removing the aliasing effect, and the proposed technique shows more excellent performance than the conventional SCM estimation technique since the spectral leakage appearing in all time-domain samples is considered.

However, a 2D Lagrange interpolation technique in the frequency domain is low in the SCM estimation accuracy and causes an interpolation error, and thus the 2D Lagrange interpolation technique is lower in MSE performance than when the preamble or the training sequence is used.

Figure 9:
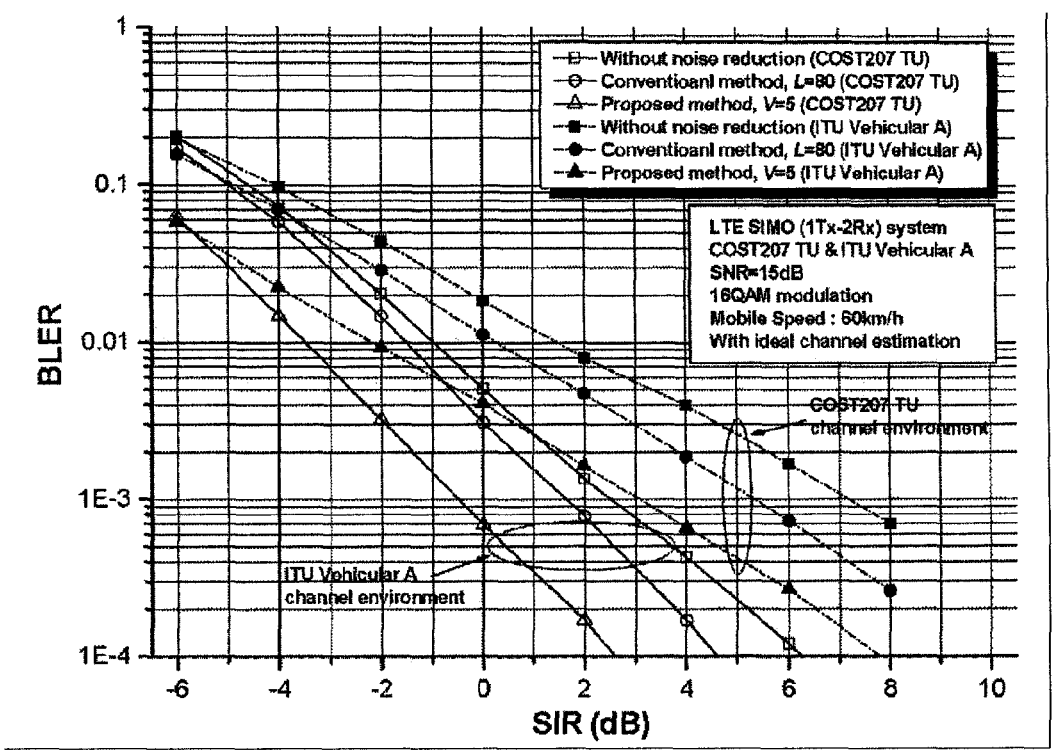
FIG. 9 is a graph illustrating block error rate (BLER) performance of an SCM estimation method according to the present invention under the assumption that a CFR of a reception signal is ideally known in a 3GPP LTE MIMO-OFDMA system.

FIG. 9 is a graph illustrating block error rate (BLER) performance of the SCM estimation method according to the present invention under the assumption that the CFR of the reception signal is ideally known in the 3GPP LTE MIMO-OFDMA system.

A simulation of verifying the performance of the algorithm proposed in the present invention was performed by recording a statistical BLER performance value through sufficiently many iteration processes in the multi-path fading channel environment that randomly changes based on the 3GPP LTE MIMO-OFDMA standard.

In particular, a 16QAM modulation scheme was used, and the speeds of various moving bodies were considered in channel environment which is COST 207 typical urban (TU) and ITU vehicular A. Parameters used in the simulation are shown in FIG. 9.

For performance evaluation, a turbo code in which a code rate is 1/3 and a mother interleaver and a 1st block interleaver are used as internal and external interleavers, respectively, was used. Further, a maximum a posteriori (MAP) turbo decoder that performs an iteration process eight times was used.

In FIG. 9, as a result of comparing and analyzing the SCM estimation performance according to a change in power of the interference signal, the conventional LPS-based SCM estimation technique showed the performance slightly more excellent than the conventional 2D interpolation technique in which the noise reduction technique is not used due to the noise reduction effect. However, since the SCM leakage phenomenon is not reflected, improvement in the performance is limited.

On the other hand, the method employing the sinc type weighting technique proposed in the present invention showed the performance improvement of about 2 dB or more at the HLER=$10^{-3}$, compared to the conventional method, due to an excellent noise reduction effect even though the V value is 5 and it is designed to have the same leakage loss as the conventional LPS technique.

Next, a description will be made in connection with two embodiments of the inter-cell interference mitigation method and the inter-cell interference mitigation receiving apparatus to which the SCM estimation method according to the present invention is applied.

A first embodiment deals with an inter-cell interference mitigation method and an inter-cell interference mitigation receiving apparatus in which a conventional channel estimation technique is combined with the SCM estimation technique according to the present invention. A second embodiment deals with an inter-cell interference mitigation method and an inter-cell interference mitigation receiving apparatus of an iterative type for maximizing the interference plus noise reduction effect by performing more effective SCM estimation in view of an actual channel estimation error.

Figure 10:
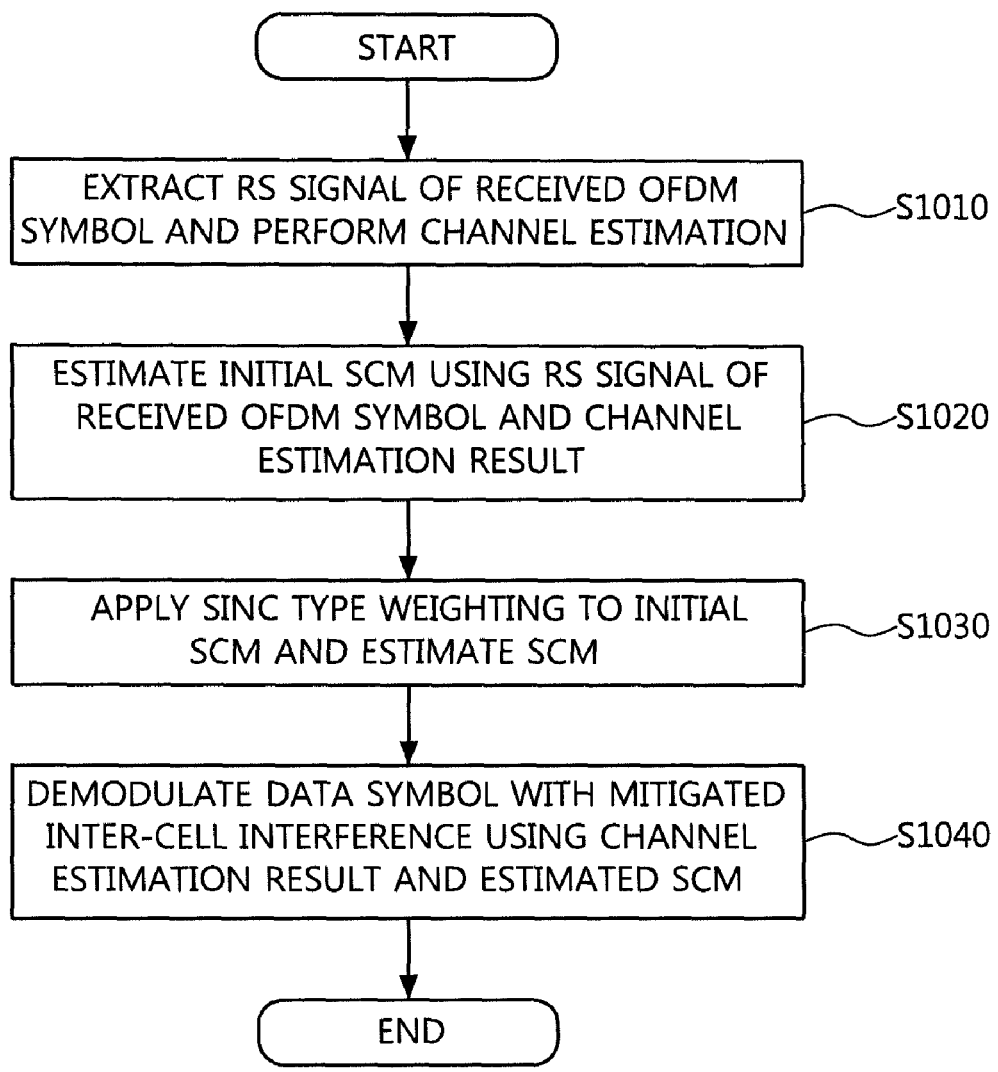
FIG. 10 is a flowchart for explaining an inter-cell interference mitigation method to which an SCM estimation method according to the present invention is applied.

First Embodiment of Inter-Cell Interference Mitigation Method and Receiving Apparatus According to Present Invention FIG. 10 is a flowchart for explaining an inter-cell interference mitigation method to which the SCM estimation method according to the present invention is applied.

Referring to FIG. 10, the inter-cell interference mitigation method according to the present invention includes an inter-cell interference mitigation method using an SCM estimation method in a MIMO-OFDM communication system for mitigating asynchronous inter-cell interference including extracting a reference symbol signal of a received OFDM symbol and performing channel estimation (S1010), estimating an initial SCM using the reference symbol signal of the OFDM symbol and the channel estimation result (S1020), applying time-domain sinc type weighting to the initial SCM and estimating an SCM (S1030), and demodulating a data symbol with mitigated inter-cell interference using the channel estimation result and the estimated SCM (S1040).

First, in step S1010 of performing channel estimation, channel estimation is performed using a conventional CFR estimation technique, for example, a discrete Fourier transform (DFT)-based channel estimation technique that has relative low complexity and can maintain the stable system performance due to the high channel estimation accuracy.

Next, in step S1020 of estimating the initial SCM, the initial SCM is estimated using the channel estimation result obtained in step S1010 of performing channel estimation and the received reference symbol signal. That is, in step S1020, the initial SCM is estimated using Formula 3 (the case of using the preamble or the training sequence) or Formula 14 (the case of estimating the initial SCM using the reference symbol signal as in the 3GPP LTE system).

Then, in step S1030 of applying time-domain sinc type weighting to the initial SCM and estimating the SCM, the SCM estimation method according to the present invention is performed by applying time-domain sinc type weighting to the initial SCM in view of the noise reduction effect and the spectral leakage effect.

That is, in step S1030, time-domain sinc type weighting according to Formula 12 is applied. As represented by the first formula in Formula 12, frequency-time domain transformation is performed using the IFFT, then sin type weight is applied, and time-frequency domain transformation is performed using the FFT. However, as represented by the second and third formulas in FIG. 12, time-domain sinc type weighting can be implemented using a moving average filter, which is one of the difference points of the SCM estimation method according to the present invention.

Meanwhile, in the 3GPP LTE system that employs the reference symbol signal instead of the preamble or the training sequence, the initial SCM is estimated only on the sub carrier in which the reference symbol signal is present as in Formula 14, interpolation on the frequency axis and the time axis according to Formula 15 is performed, and then time-domain sinc type weighting according to Formula 16 is applied.

Finally, in step S1040, data symbols in the OFDM symbol whose inter-cell interference has been mitigated are demodulated using the channel estimation result (the channel coefficient matrix) estimated in step S1010 and the initial SCM estimated in steps S1020 and S1030.

Figure 11:
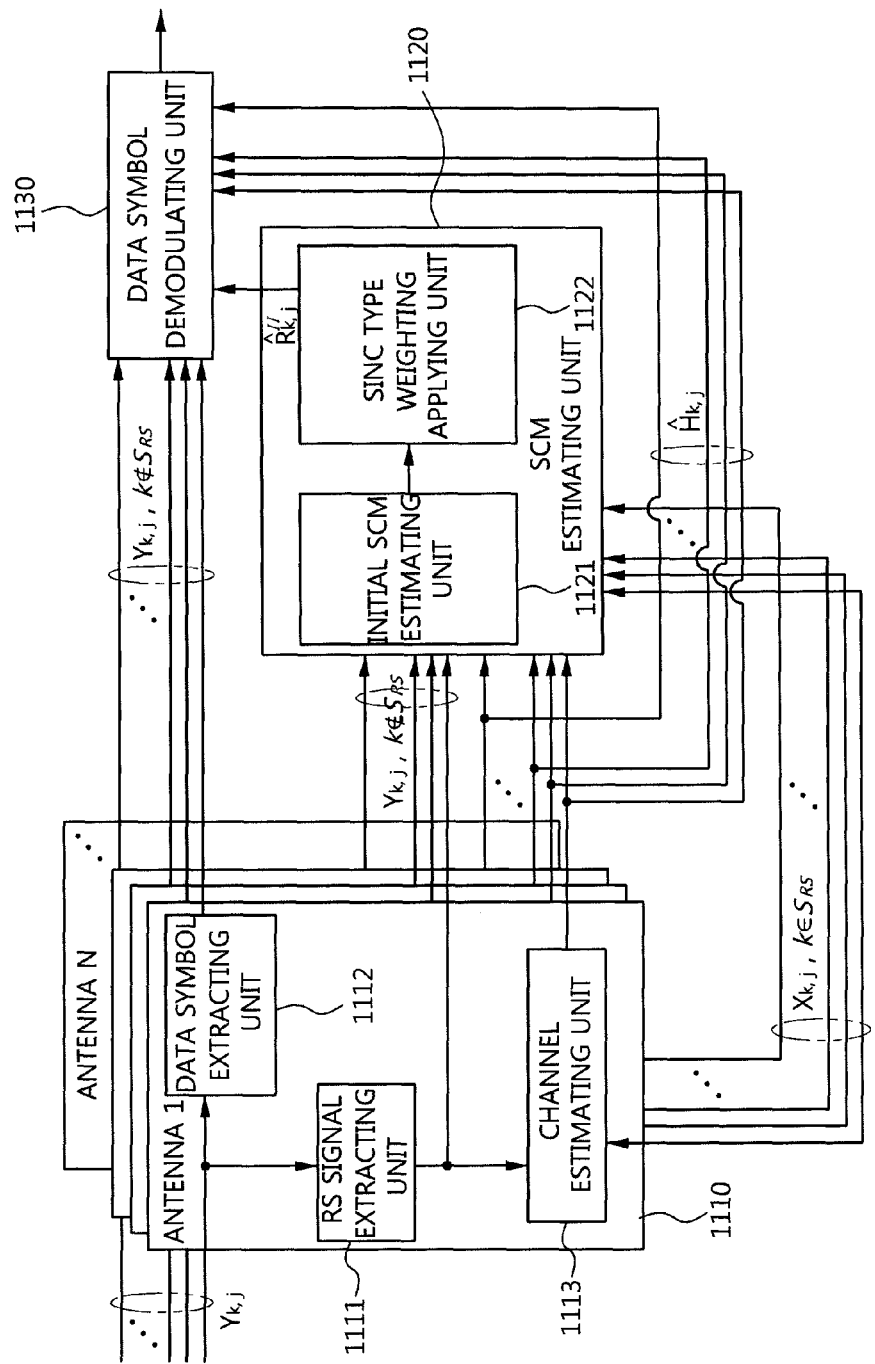
FIG. 11 is a block diagram for explaining a first embodiment of an inter-cell interference mitigation receiving apparatus to which an SCM estimation method according to the present invention is applied.

FIG. 11 is a block diagram for explaining the first embodiment of the inter-cell interference mitigation receiving apparatus to which the SCM estimation method according to the present invention is applied.

The receiving apparatus illustrated in FIG. 11 employs the conventional CFR estimation technique as an initial CFR estimation technique. A RS signal extracting unit 1111, a data symbol extracting unit 1112, and a data symbol demodulating unit 1130 are the same in configuration as those of the conventional inter-cell interference mitigation receiving apparatus illustrated in FIG. 1. A channel estimating unit 1113 which is not shown in FIG. 1 is shown in FIG. 11 as a component of a receiving unit 1110. A difference point between the inter-cell interference mitigation receiving apparatus according to the present invention and the inter-cell interference mitigation receiving apparatus according to the conventional art lies in an SCM estimating unit 1120.

Referring to FIG. 11, in the first embodiment, the inter-cell interference mitigation receiving apparatus to which the SCM estimation method according to the present invention is applied may include N receiving units 1110 each of which includes the RS signal extracting unit 1111, the data symbol extracting unit 1112, and the channel estimating unit 1113, the SCM estimating unit 1120 that includes an initial SCM estimating unit 1121 and a sinc type weighting applying unit 1122, and the data symbol demodulating unit 1130.

First, in the N receiving units 1110, the RS signal extracting unit 1111 extracts an RS signal allocated to each antenna from a reception signal in the frequency domain which has been subjected to the FFT after the cyclic prefix (CP) is removed from a signal in the time domain. The RS signal extracting unit 1111 transfers the extracted RS signal to the channel estimating unit 1113 and the SCM estimating unit 1120. The channel estimating unit 1113 applies the conventional CFR estimation technique (for example, the DFT-based channel estimation algorithm) as in step S1010 and outputs the channel estimation result to the SCM estimating unit 1120.

Next, the sin type weighting applying unit 1122 receives the initial SCM output from the initial SCM estimating unit 1121 and estimates an SCM by applying the time-domain sine type weighting according to Formula 12 to the initial SCM.

At this time, the sine type weighting applying unit 1122 applies the time-domain sine type weighting according to Formula 12. As represented in the first formula in Formula 12, the sine type weighting applying unit 1122 is configured to apply the time-domain sine type weighting such that the sine type weighting is applied after the frequency-time domain transformation by the IFFT, and then the time-frequency domain transformation is performed by the FFT. Alternatively, as represented by the second and third formulas in Formula 12, the sine type weighting applying unit 1122 may be configured to apply the time-domain sine type weighting using the moving average filter.

Meanwhile, in the 3GPP LTE system that employs the RS signal instead of the preamble or the training sequence, the sin type weighting applying 1122 may be configured to apply the time-domain sine type weighting (see Formula 16) after the initial SCM on all sub carriers is estimated (see Formula 15) by interpolation on the frequency axis and the time axis using the initial SCM estimated only on the sub carriers having the RS signal input from the initial SCM estimating unit 1121.

Finally, the SCM estimated by the SCM estimating unit 1120 is input to the data symbol demodulating unit 1130. The data symbol demodulating unit 1130 demodulates the data symbol with mitigated inter-cell interference using the SCM and the channel estimation result input from the channel estimating unit 1113.

Second Embodiment of Inter-Cell Interference Mitigation Method and Receiving Apparatus According to Present Invention Until now, analysis on the optimal SCM estimation technique has been performed in view of the trade-off relation between the noise reduction and the spectral leakage under the assumption that the receiving apparatus perfectly knows information of the multi-path channel about the transmission signal and $I_{k,j}$, which is a component of interference and noise, can be perfectly separated from the reception signal. In addition, as a result of performance evaluation, it has been verified that the optimal performance can be obtained when the time-domain sinc type weighting is applied.

Meanwhile, the inter-cell interference mitigation method illustrated in the flowchart of FIG. 10 is robust to interference and noise compared to when the conventional SCM estimation method is applied. However, since only information of the CFR and the SCM provisionally estimated at the RS position is used, there is a disadvantage in that the interference plus noise reduction effect is limited to a degree of noise reduction of the CFR and the SCM provisionally estimated at the RS position.

However, when practical channel estimation is considered, Formula 14 for calculating the initial SCM at the position of the reference symbol sub carrier needs be revised to Formula 17 in view of CFR $H_{k,j}$ estimated by the DFT-based CFR estimation (Formula 17 is the same as Formula 14 except an expression difference between ideal CFR $H_{k,j}$ and initial CFR $\widehat{H_{k,j}}$ having an error).

$$R_{k,j}^{II} = \begin{cases} (Y_{k,j} - \hat{H}_{k,j}X_{k,j})^H (Y_{k,j} - \hat{H}_{k,j}X_{k,j}), & k \in S_{RS} \\ 0, & k \notin S_{RS} \end{cases} \quad \text{Formula 17}$$

As can be seen from Formula 17, an initial SCM estimation error occurs at the RS position due to the channel estimation error, and then the error is propagated in the interpolation process on the data sub carrier between the RS sub carriers, causing degradation of the SCM estimation performance. In addition, the channel estimation error causes the performance degradation even in the channel decoding (for example, turbo decoding) process of performing demodulation using the CFR information, and thus it is difficult to maintain the stable system performance. In order to guarantee the more stable performance of the receiving apparatus, it is necessary to apply a channel estimation technique which is more accurate than the interpolation technique.

A description will be made below in connection with the inter-cell interference mitigation method and the inter-cell interference mitigation receiving apparatus capable of achieving more efficient SCM estimation and more stable inter-cell interference mitigation performance in the asynchronous inter-cell interference environment in view of an actual channel estimation error.

In order to overcome the channel estimation error and maximize the interference plus noise reduction effect, an iterative receiver structure of increasing the accuracy of the channel estimation result and the SCM estimation result using provisional demodulation reception data obtained by regenerating a symbol using the initial channel estimation result and the estimated SCM can be applied to the inter-cell interference mitigation method and the inter-cell interference mitigation receiving apparatus.

Figure 12:
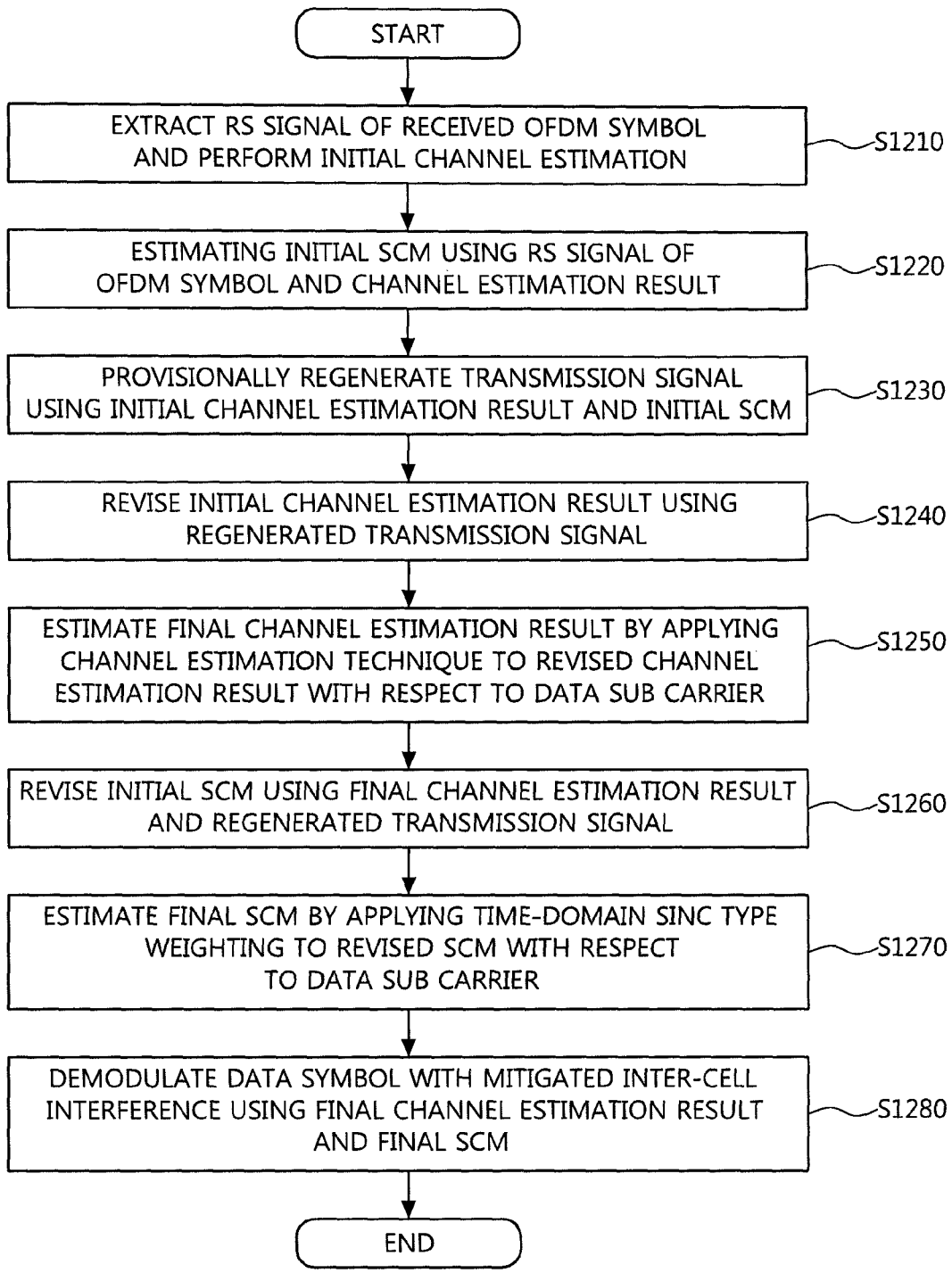
FIG. 12 is a flowchart for explaining an inter-cell interference mitigation method according to another embodiment of the present invention.

FIG. 12 is a flowchart for explaining an inter-cell interference mitigation method according to another embodiment of the present invention.

Referring to FIG. 12, an inter-cell interference mitigation method according to another embodiment of the present invention includes an inter-cell interference removing method using an SCM estimation method in a MIMO-OFDM communication system for mitigating asynchronous inter-cell interference including: extracting a RS signal of a received OFDM symbol and performing initial channel estimation (S1210); estimating an initial SCM using the RS signal of the OFDM symbol and the channel estimation result (S1220); demodulating a data symbol of the received OFDM symbol using the initial channel estimation result and the initial SCM and regenerating a transmission signal (S1230); revising the initial channel estimation result using the regenerated transmission signal (S1240); estimating a final channel estimation result by applying a DFT-based channel estimation technique to the revised channel estimation result with respect to the data sub carrier (S1250); revising the initial SCM using the final channel estimation result and the regenerated transmission signal (S1260); estimating a final SCM by applying time-domain sinc type weighting to the revised SCM with respect to the data sub carrier (S1270); and demodulating a data symbol with mitigated inter-cell interference using the final channel estimation result and the final SCM.

That is, the inter-cell interference mitigation method illustrated in FIG. 12 is divided into a first step (S1210 and S1220) of estimating the initial CFR and the initial SCM at the sub carrier position to which the reference symbol is allocated and a second step (S1230 to S1270) of re-estimating the CFR and the SCM using the reception signal provisionally demodulated using the initial CFR and the initial SCM.

Here, steps S1210 to 1280 will be described in detail.

First, in step S1310, the initial CFR (which is not an ideal CFR $H_{k,j}$ but an initial CFR having an error $\widehat{H_{k,j}}$) is estimated by applying a conventional channel estimation algorithm (for example, the DFT-based channel estimation algorithm) at the position of the sub carrier in which the RS signal is present.

Next, in step S1320, the initial SCM is estimated using the CFR estimated in step S1310 by Formula 17 (as described above, Formula 17 is the same as Formula 14 except an expression difference between ideal CFR $H_{k,j}$ and initial CFR $\widehat{H_{k,j}}$ having an error).

Then, in step S1330, a data symbol is provisionally demodulated using the CFR $\hat{H}_{k,j}$ estimated in step S1310 and the initial SCM $\hat{R}_{k,j}^{II}$ estimated in step S1320.

At this time, decoding the data symbol means detecting the transmission signal by performing maximum likelihood (ML) decision on the reception signal as in Formula 18 or regenerating the transmission signal after turbo decoding using a log-likelihood ratio (LLR) calculated by Formula 19.

$$\hat{X}_{k,j} = \underset{z \in S_D}{\arg\min} |Y_{k,j} - \hat{H}_{k,j}X_{k,j}^z|^2_{(\hat{R}_{k,j}^{II})^{-1}}, k \notin S_{RS} \quad \text{Formula 18}$$

where, $S_D$ = a set of transmit symbols, $\|A\|_B^2 = A^*BA$, $(\cdot)^*$ = conjugate transpose $$LLR(b_i | y) \approx \max_{x \in X_c^{(+1)}} |y' - H'x|^2 - \max_{x \in X_c^{(-1)}} |y' - H'x|^2 \quad \text{Formula 19}$$

where $y' = (\hat{R}^{II})^{-1/2} y$, $H' = (\hat{R}^{II})^{-1/2} H$

Next, in step S1340, the estimated initial channel estimation value $\hat{X}_{k,j}$ is revised using the provisional data symbol $\hat{X}_{k,j}$ determined in step S3230 by Formula 20.

$$\overline{H}_{k,j} = \begin{cases} \hat{H}_{k,j}, & k \in S_{RS} \\ \dfrac{Y_{k,j}}{\hat{X}_{k,j}}, & k \notin S_{RS} \end{cases} \quad \text{Formula 20}$$

Next, in step S1350, the final CFR $\tilde{H}_{k,j}$ is estimated by applying the DFT-based channel estimation technique to the channel value $\bar{H}_{k,j}$ revised by Formula 20 with respect to the data sub carrier.

That is, in step S1340 and step S1350, unlike the technique of obtaining the channel estimation value of the data sub carrier by interpolation on the frequency axis and the time axis using the channel estimation value of the sub carrier having the RS signal, the initial channel estimation value is revised using the provisionally demodulated data symbol, and then the DFT-based channel estimation technique is applied again, so that the accuracy of the channel estimation result increases.

Next, in step S1360, the estimated initial SCM value is revised using the final CFR $\tilde{H}_{k,j}$ obtained in step S1350 and the provisional data symbol $\hat{X}_{k,j}$ by Formula 21.

$$\overline{R}_{k,j}^{II} = \begin{cases} \hat{R}_{k,j}^{II}, & k \in S_{RS} \\ (Y_{k,j} - \tilde{H}_{k,j}\hat{X}_{k,j})^H (Y_{k,j} - \tilde{H}_{k,j}\hat{X}_{k,j}), & k \notin S_{RS} \end{cases} \quad \text{Formula 21}$$

Next, in step S1370, the final SCM $\tilde{R}_{k,j}^{II}$ is estimated by applying the SCM estimation technique of applying the time-domain sine type weighting according to the present invention to the SCM $\overline{R}_{k,j}^{II}$ revised by Formula 21 with respect to the data sub carrier.

That is, in steps S1260 and S1270, similarly to steps S1240 and S1250, unlike the technique of obtaining the initial SCM of the data sub carrier by interpolation on the frequency axis and the time axis using the initial SCM of the sub carrier having the RS signal, the initial SCM of all sub carriers is obtained by revising the initial SCM using the provisionally demodulated data symbol, and then the time-domain sine type weight according to the present invention is applied, so that the accuracy of the SCM estimation result increases.

Finally, in step S1380, demodulation during which the inter-cell interference is mitigated is performed on the data symbols in the OFDM symbol suing the final channel estimation result estimated in step S1350 and the SCM finally estimated in step S1370.

As described above, in the inter-cell interference mitigation method of the iterative method proposed in FIG. 12, the initially estimated CFR and the initially estimated SCM are revised using the RS signal sub carrier and the provisionally demodulated data symbol at the data sub carrier position. In addition, all CFR and SCM information about the effective sub carrier can be used when the conventional CFR algorithm and the SCM estimation technique according to the present invention are performed again. Thus, the interference plus noise reduction effect higher than the conventional method can be achieved.

Since the CFR estimation performance is improved, the SCM estimation performance degradation caused by the channel estimation error can be effectively overcome. In addition, power of interference plus noise abruptly increasing at the data sub carrier position can be estimated approximately more than the conventional SCM method. Accordingly, the SCM estimation performance is improved.

Figure 13:
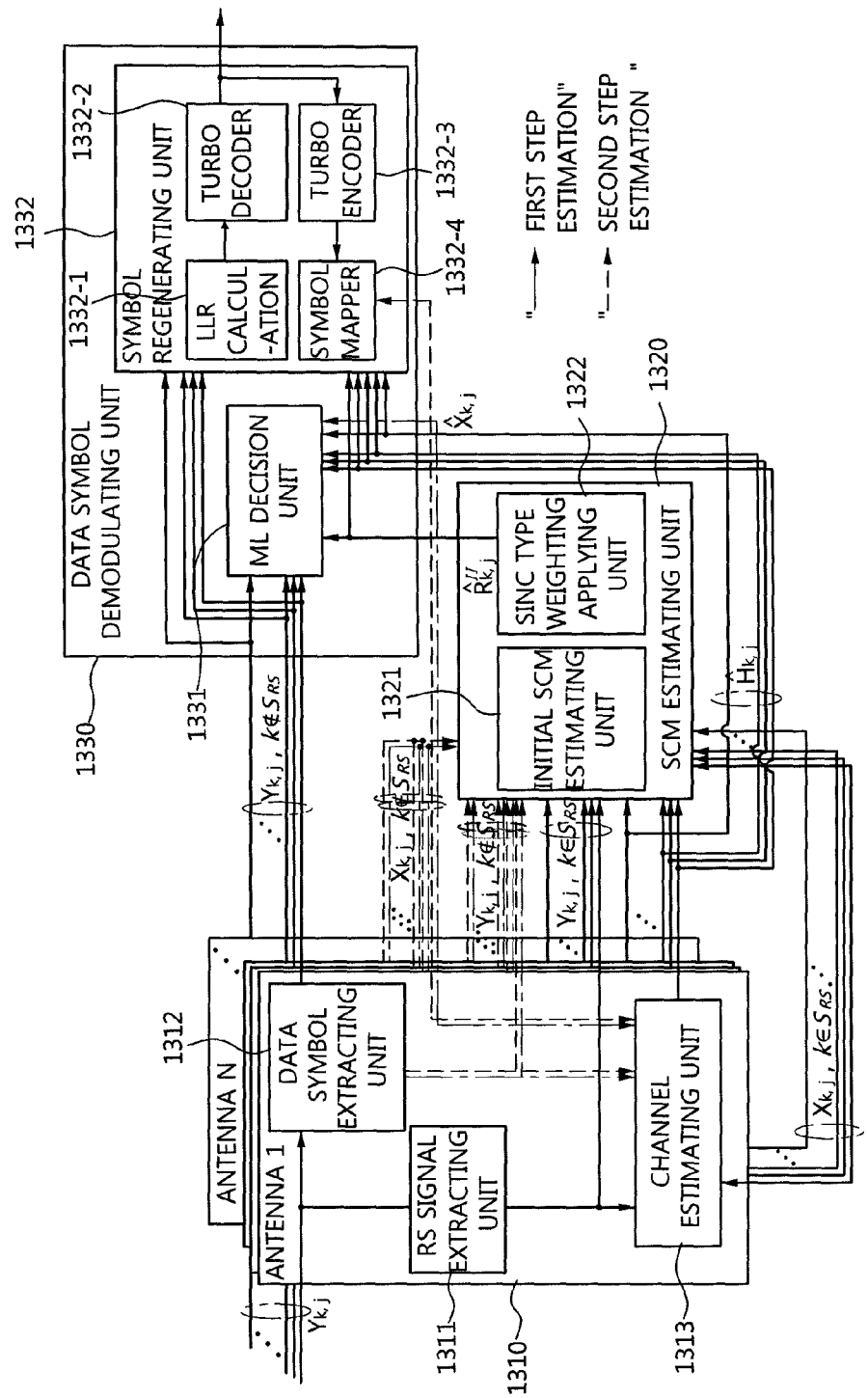
FIG. 13 is a block diagram for explaining a second embodiment of an inter-cell interference mitigation receiving apparatus of a 3GPP LET MIMO-OFDMA system to which an SCM estimation method according to the present invention is applied.

FIG. 13 is a block diagram for explaining a second embodiment of an inter-cell interference mitigation receiving apparatus of the 3GPP LET MIMO-OFDMA system to which the SCM estimation method according to the present invention is applied.

A receiver structure illustrated in FIG. 13 is a structure of a receiving apparatus to which the receiving method of the iterative structure described with reference to FIG. 12 is applied. An RS signal extracting unit 1311 and a data symbol extracting unit 1312 have the same configurations as those of the structure of the inter-cell interference mitigation receiving apparatus of the first embodiment illustrated in FIG. 11.

As described above with reference to FIG. 12, a difference point of the receiving method of the iterative structure lies in that a channel estimation result output from a channel estimating unit 1313 and an SCM estimation result output from an SCM estimating unit 1320 are output as a first step estimation value and a second step estimation value, respectively, and a data symbol demodulating unit 1330 outputs a provisionally demodulated data symbol in a first step, demodulates a data symbol using a second step channel estimation value and an SCM estimation value, and outputs the demodulated data symbol. Referring back to FIG. 13, in the second embodiment, the inter-cell reference mitigation receiving apparatus to which the SCM estimation method according to the present invention is applied may be configured to include N receiving units 1310 each of which includes the RS symbol extracting unit 1311, the data symbol extracting unit, and the channel estimating unit 131, the SCM estimating unit 1320 that includes an initial SCM estimating unit 1321 and a sinc type weighting applying unit 1322, and the data symbol demodulating unit 1330.

First, in the N receiving units 1110, the RS signal extracting unit 1311 extracts an RS signal allocated to each antenna from a reception signal in the frequency domain which has been subjected to the FFT after the cyclic prefix (CP) is removed from a signal in the time domain. The RS signal extracting unit 1311 transfers the extracted RS signal to the channel estimating unit 1313 and the SCM estimating unit 1320.

The channel estimating unit 1313 performs operations of two steps. In a first step, the channel estimating unit 1113 applies the conventional CFR estimation technique (for example, the DFT-based channel estimation algorithm) as in step S1310 and outputs the initial channel estimation result to the SCM estimating unit 1320 and the data symbol demodulating unit 1330.

Similarly, the SCM estimating unit 1320 performs operations of two steps. First, in a first step, the SCM estimating unit 1320 receives the initial channel estimation result $H_{k,j}$ estimated in the first step from the channel estimating unit 1313, calculates the initial SCM $R_{k,j}^n$ by Formula 14, and outputs the initial SCM $R_{k,j}^n$ to the data symbol demodulating unit 1330 as in step S1320. As described above, the initial SCM estimating unit 1321 that is a component of the SCM estimating unit 1320 may be configured to perform initial SCM estimation of the first step.

Next, the data symbol demodulating unit 1330 also performs operations of two steps. First, in a first step, the data symbol demodulating unit 1330 provisionally demodulates the data symbol using the initial channel estimation result output from the channel estimating unit 1313 and the initial SCM output from the SCM estimating unit 1320. The provisional data symbol demodulating operation performed by the data symbol demodulating unit 1330 can be described as the operation performed in step S1330.

The provisional data symbol regenerated in the data symbol demodulating unit 1330 is transferred to the channel estimating unit 1313. As an operation of a second step, the channel estimating unit 1313 revises the initial channel estimating result using the provisionally demodulated data symbol and the initial channel estimation result of the first step and outputs a final channel estimation result.

The second step operation performed by the channel estimating unit 1313 means the operations performed in steps S1340 and S1350. The final channel estimation result determined by the channel estimating unit 131 is input to the data symbol demodulating unit 1330 and the SCM estimating unit 1320 for the second step operation.

The final channel estimation result determined by the channel estimating unit 1313 and the provisional data symbol regenerated in the data symbol demodulating unit 1330 are used for the second step operation of the SCM estimating unit 1320. That is, the SCM estimating unit 1320 performs an operation of revising the initial SCM using the final channel estimation result output from the channel estimating unit in the second step and the provisionally demodulated data symbol of the data sub carrier, and estimating a final SCM by applying the time-domain sinc type weighting to the revised SCM. As described above, the sinc type weighting applying unit 1322 that is a component of the SCM estimating unit 1320 may be configured to estimate final SCM estimation of the second step.

At this time, the sinc type weighting applying unit 1322 applies the time-domain sinc type weighting according to Formula 12. As represented by the first formula in Formula 12, the sinc type weighting applying unit 1122 is configured to apply the time-domain sinc type weighting such that the sinc type weighting is applied after the frequency-time domain transformation by the IFFT, and then the time-frequency domain transformation is performed by the FFT. Alternatively, as represented by the second and third formulas in Formula 12, the sinc type weighting applying unit 1122 may be configured to apply the time-domain sinc type weighting using the moving average filter.

That is, the second step operation performed by the SCM estimating unit 1320 means the operations performed in steps S1360 and S1370. The final SCM estimation result determined by the SCM estimating unit 1320 is input to the data symbol demodulating unit 1330.

Finally, the data symbol demodulating unit 1330 receives the final channel estimation result transferred from the channel estimating unit 1313 and the final SCM estimation result transferred from the SCM estimating unit 1320, and performs demodulation during which inter-cell interference is mitigated on the data symbol extracted by the data symbol extracting unit 1312.

Figure 14:
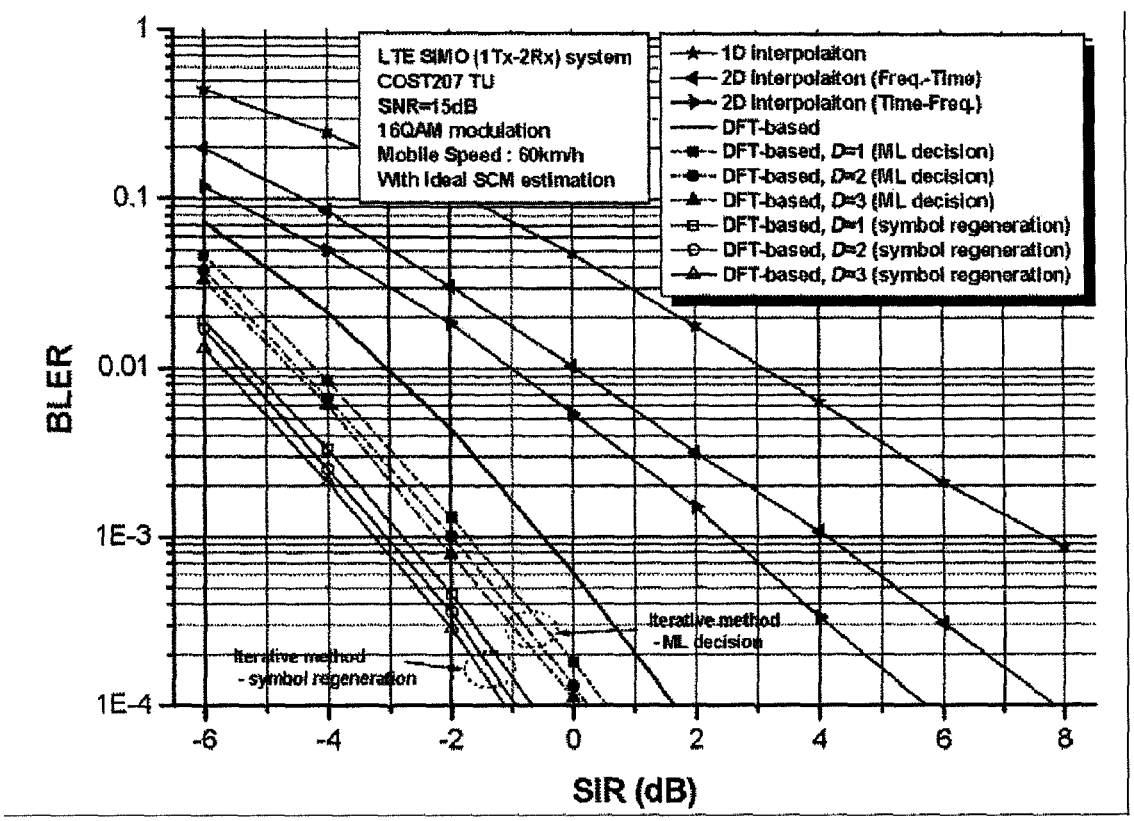
FIG. 14 is a graph illustrating BLER performance of a CFR estimation technique proposed in the present invention in a COST 207 TU channel environment under the assumption that an SCM on interference and noise is ideally known.

FIG. 14 is a graph illustrating BLER performance of the CFR estimation technique proposed in the present invention in a COST 207 TU channel environment under the assumption that the SCM on interference and noise is ideally known.

It was assumed that the SCM can be perfectly estimated by the receiver so as to evaluate performance of various channel estimation techniques in a single input-multi output (SIMO)-OFDMA system of 1Tx-2Rx.

The CFR estimation techniques set as comparison targets are as follows.

(1) 1D (dimensional) Interpolation (this is a primary linear interpolation technique of the conventional Lagrange interpolation technique, and the same CFR and SCM, which are estimated on a data OFDM symbol before a next reference symbol after frequency-axis interpolation, are applied)

(2) 2D Interpolation (Frequency-Time) (this is a primary linear interpolation technique of the conventional Lagrange interpolation technique, and frequency-axis interpolation precedes time-axis interpolation)

(3) 2D Interpolation (Time-Frequency) (this is a primary linear interpolation technique of the conventional Lagrange interpolation technique, and time-axis interpolation precedes frequency-axis interpolation)

As a result of comparison and analysis according to a variation in power of the interference signal, it was found that the linear interpolation-based CFR estimation having an advantage of relatively low complexity showed performance more excellent than other linear interpolation techniques when time-axis interpolation is first performed since a channel relatively less changes according to a time in a moving body environment of 60 km/h.

However, due to an error caused by inter-cell interference and an error of Lagrange interpolation, the linear interpolation-based CFR estimation was significantly degraded and could not maintain stable system performance. The DFT-based channel estimation algorithm showed excellent performance much more than the liner interpolation-based channel estimation technique. When the iterative receiver structure of the present invention is applied, as the number of times of iteration D increases, performance improvement of about 2.5 dB at maximum BLER=$10^{-3}$ was achieved.

It is because the accuracy of CFR estimation was improved by effectively overcoming the limit of the channel estimation performance of the conventional DFT-based channel estimation algorithm, and the iterative receiver structure of the present invention is considered as an optimal CFR estimation method capable of achieving performance approximate to ideal performance in the asynchronous inter-cell interference I environment.

Since it is higher in accuracy in the symbol regeneration process after turbo decoding than the ML decision, the estimation method of the present invention is about 1.5 dB higher in the performance. As the number of times of iteration increases to 2 and 3, the performance improvements of 0.2 dB and 0.4 dB are shown, respectively. In the present embodiment, 1 is selected as the number of times of iteration in terms of complexity, however, in another embodiment, 2 or more may be selected as the number of times of iteration.

Figure 15:
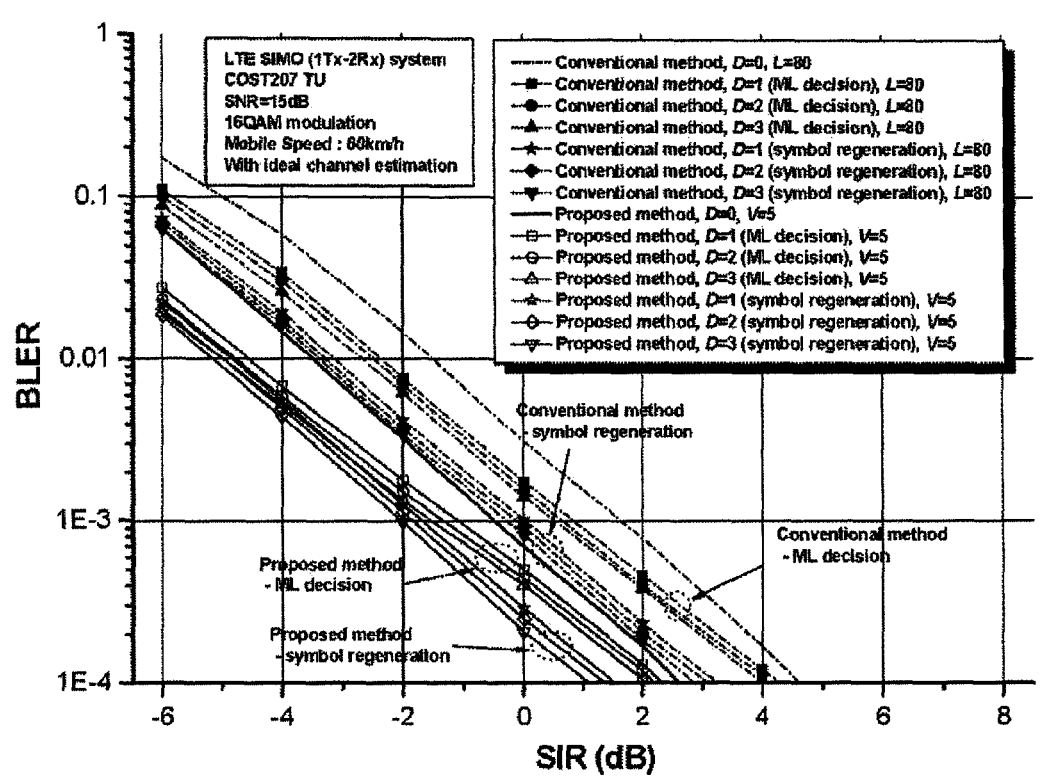
FIG. 15 is a graph illustrating BLER performance of an SCM estimation technique of the present invention under the assumption that a CFR of a reception signal is ideally known.

FIG. 15 is a graph illustrating the BLER performance of the SCM estimation technique of the present invention under the assumption that the CFR of the reception signal is ideally known.

Similarly to FIG. 14, it was assumed that the CFR of the reception signal can be perfectly estimated by the receiver for the sake of performance evaluation of the conventional SCM estimation technique and the improved SCM estimation technique in the SIMO-OFDMA system of 1Tx-2Rx.

As already observed in FIG. 9, the improved SCM estimation technique in which the spectral leakage effect is considered shows the performance more excellent than the conventional LPS-based SCM estimation technique, and when the iterative receiver structure is applied, the improved SCM estimation technique shows the performance improvement of about 2 dB at BLER-$10^{-3}$ as the number of times of iteration increases.

It is because performance degradation, which occurs since power of asynchronous inter-cell interference and noise abruptly increasing due to the inter-cell interference within the effective sub carrier range cannot be accurately estimated by the linear interpolation technique applied to remove the aliasing effect at the time of initial SCM estimation, is improved by applying the iteration estimation technique.

In addition, similarly to the performance improvement effect of the CFR estimation technique, the more effective noise reduction effect can be obtained by overcoming the limit of the performance occurring since only the instantaneous SCM estimated at the reference symbol position is used. Since the estimation technique of the present invention is higher in the accuracy in the symbol regeneration process after the turbo decoding than the ML decision, the iteration estimation technique shows the more excellent performance by about 1 dB. The estimation technique of the present invention shows the performance improvement of 0.2 dB and 0.4 dB as the number of times of iteration increases to 2 and 3, respectively. However, in the present embodiment, 1 is selected as the number of times of iteration in view of complexity, however, in another embodiment, 2 or more may be selected as the number of times of iteration.

Figure 16:
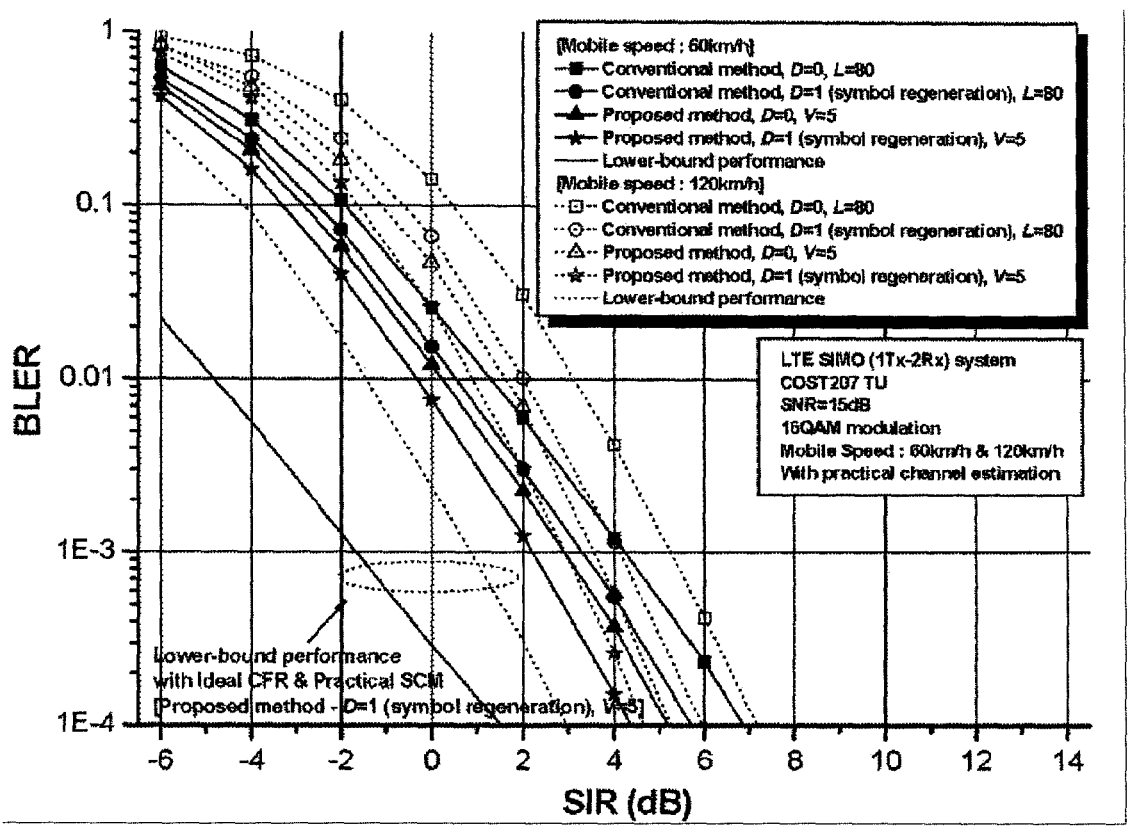
FIGS. 16 and 17 are a graph illustrating BLER performance comparison of an iterative receiver structure to which a CFR and SCM estimation algorithm according to the present invention is applied.
Figure 17:
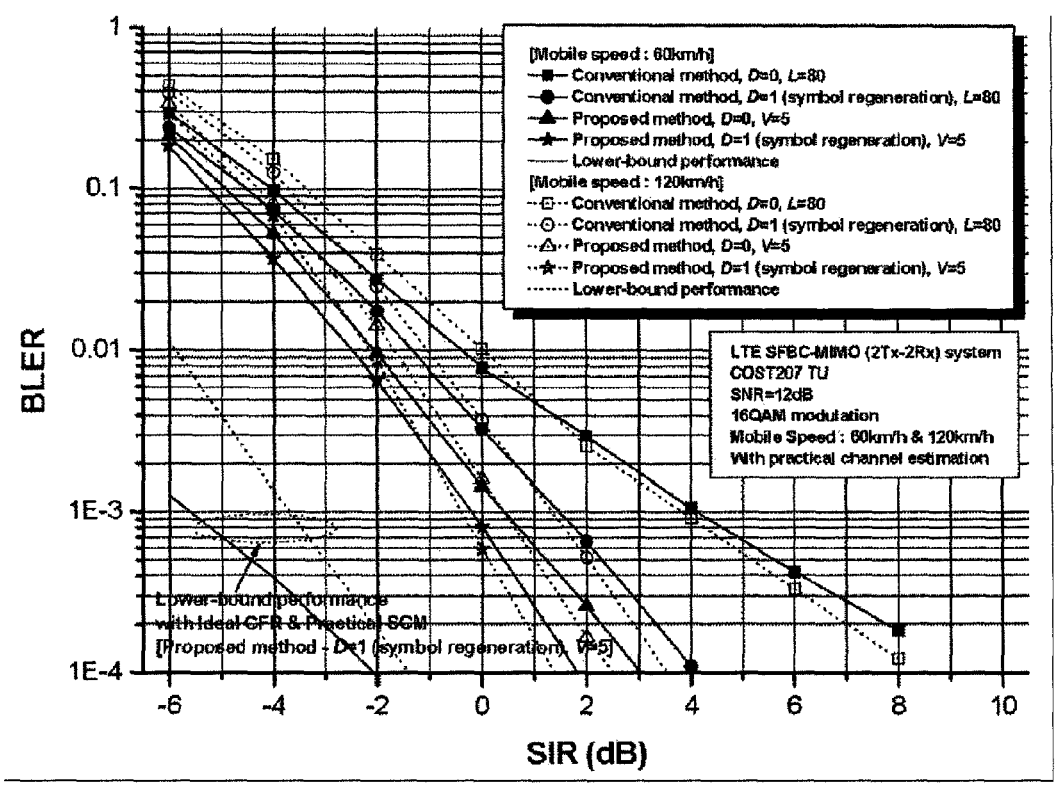

FIGS. 16 and 17 are graphs illustrating the BLER performance comparison of the iterative receiver structure to which the CFR and SCM estimation algorithm according to the present invention is applied.

In FIG. 16, a SIMO-OFDMA system of 1Tx-2Rx was considered, and in FIG. 17, a space frequency block code (SFBC) MIMO-OFDMA system of 2Tx-2Rx was considered.

Lower-bound performances shown in FIGS. 16 and 17 assume ideal CFR estimation and were obtained when the SCM estimation technique according to the present invention and the iteration estimation technique of regenerating the reception symbol after turbo decoding were applied. The lower-bound performances can be used as a measure of a performance degradation degree of the proposed estimation algorithm caused by the channel estimation error when actual CFR estimation is performed.

As can be seen from the performance evaluation result, the structure proposed in the present invention shows the SCM estimation performance more excellent than the conventional SCM estimation technique. In addition, since the iteration estimation technique is applied and CFR and SCM information about the data sub carrier is used, the interference plus noise reduction effect increases, and the accuracy of the CFR and SCM estimation is improved. Compared to the conventional method, the performance is improved by about 1.5 dB to about 2.5 dB, and even when practical CFR estimation is considered, secured is a stable receiver operation that approaches to the lower-bound performance within about 3 dB in all environments without an error floor phenomenon.

When the performance evaluation results of FIGS. 14 to 21 are considered, the receiver structure to which the SCM estimation technique of the present invention in which the trade-off relation between the noise reduction and the spectral leakage is considered in the inter-cell interference environment and the iteration estimation technique improving the restrictive shortcomings such as the noise reduction effect of the conventional estimation technique using only the initial CFR and SCM information estimated at the reference symbol sub carrier position in the 3GPP LTE MIMO-OFDMA system are applied achieves the performance more excellent than the conventional technique even in the environment in which the Doppler shift gets worse due to the frequency selective fading influence of the multi-path fading channel and an increase in the speed of the moving body and thus can be considered as a technique capable of guaranteeing the stable receiver performance.

While the example embodiments of the present invention and their advantages have been described in detail, it should be understood that various changes, substitutions and alterations may be made herein without departing from the scope of the invention.

What is claimed is:

1. An inter-cell interference mitigation method using a spatial covariance matrix (SCM) estimation method in a multi-input multi-output (MIMO) orthogonal frequency division multiplexing (OFDM) communication system for mitigating interference between asynchronous cells, comprising:

extracting a reference symbol (RS) of a received OFDM symbol and performing channel estimation;
   estimating an initial SCM using the RS signal and the channel estimation result;
   applying time-domain sinc type weighting to the initial SCM and applying an SCM; and
   demodulating a data symbol with mitigated inter-cell interference using the channel estimation result and the estimated SCM.

2. The inter-cell interference mitigation method according to claim 1, wherein the performing of the channel estimation includes performing discrete Fourier transform (DFT)-based channel estimation.

3. The inter-cell interference mitigation method according to claim 1, wherein in the estimating of the initial SCM, the initial SCM is estimated by Formula 1

$$R_{k,j}^{II} = \begin{cases} (Y_{k,j} - H_{k,j}X_{k,j})^H (Y_{k,j} - H_{k,j}X_{k,j}), & k \in S_{RS} \\ 0, & k \notin S_{RS} \end{cases} \quad \text{Formula 1}$$

where, $S_p$ = a set of reference symbol index, where $H_{k,j}$ represents a channel estimation result, $X_{k,j}$ represents a transmission signal, $Y_{k,j}$ represents a reception signal (the RS signal), $S_{RS}$ represents a set of indices of sub carriers having the RS signal, k represents a sub carrier index, and j an index of an OFDM symbol.

4. The inter-cell interference mitigation method according to claim 3, wherein in the estimating of the SCM, the time-domain sinc type weighting is applied by Formula 2

$$\tilde{S}_k^{(n,m)} = FFT_K\left[\left(\left|\frac{1}{K}\frac{\sin(\pi i V/K)}{\pi i V/K}\right|\right) \cdot (s_i'^{(n,m)})\right] \quad \text{Formula 2}$$

$$= M_k^a \otimes S_k'^{(n,m)}, \text{ where } M_k^a$$

$$= \begin{cases} \alpha_k (= \text{constant}), & |k| \leq \frac{V}{2}, \frac{K}{V} > \tau_{max} \text{ or } V < \frac{K}{\tau_{max}} \\ 0, & \text{otherwise} \end{cases}$$

$$= \sum_{l=-V/2}^{V/2} M_k^a \cdot S_{k+l}'^{(n,m)}$$

such that the sinc type weighting is applied after frequency-time domain transformation by inverse fast Fourier transform (IFFT), and then time-frequency domain transformation is performed by fast Fourier transform (FFT), which is represented by a first formula or such that the time sinc type weighting is applied in a frequency domain using a moving average filter $M_{k^a}$ represented by second and third formulas (here, k represents a total of the number of sub carriers, $\tau_{max}$ represents a maximum delay time of a multi-path channel, $$S_k^{(n,m)} = R_k^{II}[n,m], \text{ where } \begin{cases} m, n = 1, \ldots, N \\ k = 0, \ldots, K-1 \end{cases},$$

and $s_i^{(n,m)} = \text{IFFT}_K[S_k^{(n,m)}]$ (N represents the number of antennas, and V is a constant deciding a form of a sinc function to which the sinc type weighting is applied)).

5. The inter-cell interference mitigation method according to claim 4, wherein the estimating of the SCM includes estimating the initial SCM on all sub carriers by interpolating the initial SCM estimated by Formula 1 on a frequency axis and a time axis by Formula 3 before Formula 2 is applied and applying the time-domain sinc type weighting by Formula 4

$$R''^{II}_{N_f \cdot k + \beta_1, j} =$$

Formula 3

$$R^{II}_{N_{RS_f} \cdot k, j}\left(1 - \frac{\beta_1}{N_f}\right) + R^{II}_{(k+1) \cdot N_{RS_f}, j}\left(\frac{\beta_1}{N_f}\right): \text{Frequency}$$

$$R'''^{II}_{k, N_t \cdot j + \beta_2} = R'^{II}_{k, N_{RS_t} \cdot j}\left(1 - \frac{\beta_2}{N_t}\right) + R'^{II}_{k, (j+1) \cdot N_{RS_t}}\left(\frac{\beta_2}{N_t}\right): \text{Time}$$

where $\beta_1 = 0, 1, \ldots, N_f - 1, \beta_2 = 0, 1, \ldots, N_t - 1$, $$\hat{R}^{II}_k = \begin{bmatrix} \hat{S}^{(1,1)}_k & \cdots & \hat{S}^{(1,N)}_k \\ \vdots & \ddots & \vdots \\ \hat{S}^{(N,1)}_k & \cdots & \hat{S}^{(N,N)}_k \end{bmatrix}, \text{where}$$

Formula 4

$$\hat{S}^{(n,m)}_k =$$

$$\begin{cases} FFT_K[d_i \cdot IFFT_K[R''^{II}_k[n,m]]]: \text{Conventional method} \\ \sum_{l=-V/2}^{V/2} M^a_k \cdot R''^{II}_{k+l}[n,m]: \text{Proposed method} \end{cases}$$

6. An inter-cell interference mitigation method using spatial covariance matrix (SCM) estimation in a multi-input multi-output (MIMO) orthogonal frequency division multiplexing (OFDM) communication system for mitigating interference between asynchronous cells, comprising:
   extracting a reference symbol (RS) signal of a received OFDM symbol and performing initial channel estimation;
   estimating an initial SCM using the RS signal and the channel estimation result;
   demodulating a data symbol of the received OFDM symbol using the initial channel estimation result and the initial SCM and regenerating a transmission signal;
   revising the initial channel estimation result using the regenerated transmission signal;
   applying a discrete Fourier transform (DFT)-based channel estimation technique to the revised channel estimation result with respect to a data sub carrier and estimating a final channel estimation result;
   revising the initial SCM using the final channel estimation result and the regenerated transmission signal;
   applying time-domain sinc type weighting to the revised SCM with respect to the data sub carrier and estimating a final SCM; and
   demodulating a data symbol with mitigated inter-cell interference using the final channel estimation result and the final SCM.

7. The inter-cell interference mitigation method according to claim 6, wherein the performing of the channel estimation includes performing discrete Fourier transform (DFT)-based channel estimation.

8. The inter-cell interference mitigation method according to claim 6, wherein in the estimating of the initial SCM, the initial SCM is estimated by Formula 1

$$R^{II}_{k,j} = \begin{cases} (Y_{k,j} - \hat{H}_{k,j}X_{k,j})^H (Y_{k,j} - \hat{H}_{k,j}X_{k,j}), & k \in S_{RS} \\ 0, & k \notin S_{RS} \end{cases}$$

Formula 1 where $\tilde{H}_{k,j}$ represents an initial channel estimation result obtained in the performing of the initial channel estimation, $X_{k,j}$ represents a transmission signal, $Y_{k,j}$ represents a reception signal (the RS signal), $S_{RS}$ represents a set of indices of sub carriers having the RS signal, k represents a sub carrier index, and j an index of an OFDM symbol.

9. The inter-cell interference mitigation method according to claim 8, wherein the regenerating of the transmission signal includes detecting the transmission signal by performing maximum likelihood (ML) decision on the data symbol by Formula 2 using the initial channel estimation result and the initial SCM or regenerating an arbitrary transmission signal $\widehat{H_{k,j}}$ after turbo decoding using a log-likelihood ratio calculated by Formula 3

$$\hat{X}_{k,j} = \arg\min_{z \in S_D} |Y_{k,j} - \hat{H}_{k,j} X^z_{k,j}|^2_{(\hat{R}^{II}_{k,j})^{-1}}, k \notin S_{RS}$$

Formula 2 where, $S_D$ = a set of transmit symbols, $\|A\|^2_B = A^* B A, (\cdot)^* = $ conjugate transpose $$LLR(b_i \mid y) \approx \max_{x \in X^{(+1)}_G} |y' - H'x|^2 - \max_{x \in X^{(-1)}_C} |y' - H'x|^2$$

Formula 3 where, $y' = (\hat{R}^{II})^{-1/2} y, H' = (\hat{R}^{II})^{-1/2} H$.

10. The inter-cell interference mitigation method according to claim 9, wherein the revising of the initial channel estimation result includes revising an initially estimated channel estimation value $\hat{X}_{k,j}$ using a provisional data symbol $\hat{X}_{k,j}$ decided in the regenerating of the transmission signal by Formula 4

$$\overline{H}_{k,j} = \begin{cases} \hat{H}_{k,j}, & k \in S_{RS} \\ \dfrac{Y_{k,j}}{\hat{X}_{k,j}}, & k \notin S_{RS} \end{cases}.$$

Formula 4

11. The inter-cell interference mitigation method according to claim 10, wherein the estimating of the final channel estimation result includes applying a DFT-based channel estimation technique to the channel value $\overline{H}_{k,j}$ revised in the revising of the initial channel estimation result with respect to the data sub carrier having no the RS signal and estimating a final channel estimation result $\tilde{H}_{k,j}$.

12. The inter-cell interference mitigation method according to claim 11, wherein the revising of the initial SCM includes revising an SCM value initially estimated in the estimating of the initial SCM using the final channel estimation result $\tilde{H}_{k,j}$ obtained in the estimating of the final channel estimation result and the provisional data symbol $\hat{X}_{k,j}$ by Formula 5

$$\overline{R}^{II}_{k,j} = \begin{cases} \hat{R}^{II}_{k,j}, & k \in S_{RS} \\ (Y_{k,j} - \tilde{H}_{k,j}\hat{X}_{k,j})^H (Y_{k,j} - \tilde{H}_{k,j}\hat{X}_{k,j}), & k \notin S_{RS} \end{cases}.$$

Formula 5

13. The inter-cell interference mitigation method according to claim 12, wherein the estimating of the final SCM includes applying time-domain sinc type weighting to the revised SCM obtained in the revising of the initial SCM with respect to the data sub carrier having no RS signal and estimating the final SCM.

14. The inter-cell interference mitigation method according to claim 13, wherein the time-domain sinc type weighting is applied by Formula 6

$$\tilde{S}_k^{(n,m)} = FFT_K\left[\left(\left|\frac{1}{K}\frac{\sin(\pi i V/K)}{\pi i V/K}\right|\right) \cdot (s_i'^{(n,m)})\right] \quad \text{Formula 2}$$

$$= M_k^a \otimes S_k'^{(n,m)}, \text{ where } M_k^a$$

$$= \begin{cases} \alpha_k(=\text{constant}), & |k| \le \frac{V}{2}, \frac{K}{V} > \tau_{max} \text{ or } V < \frac{K}{\tau_{max}} \\ 0, & \text{otherwise} \end{cases}$$

$$= \sum_{l=-V/2}^{V/2} M_k^a \cdot S_{k+l}'^{(n,m)},$$

wherein the sinc type weighting is applied such that the sinc type weighting is applied after frequency-time domain transformation by inverse fast Fourier transform (IFFT), and then time-frequency domain transformation is performed by fast Fourier transform (FFT), which is represented by a first formula or the time sinc type weighting is applied in a frequency domain using a moving average filter $M_{k^a}$ represented by second and third formulas
  (here, k represents a total of the number of sub carriers, $\tau_{max}$ represents a maximum delay time of a multi-path channel, $$S_k^{(n,m)} = R_k^{II}[n,m], \text{ where } \begin{cases} m, n = 1, \ldots, N \\ k = 0, \ldots, K-1 \end{cases},$$

and $s_i^{(n,m)} = IFFT_K[S_k^{(n,m)}]$ (N represents the number of antennas, and V is a constant deciding a form of a sinc function to which the sinc type weighting is applied)).

15. A spatial covariance matrix (SCM) estimation method for inter-cell interference mitigation in a multi-input multi-output (MIMO) orthogonal frequency division multiplexing (OFDM) communication system, comprising:
  extracting a preamble, a training sequence, or a reference symbol (RS) signal of a received OFDM symbol and performing channel estimation;
  estimating an initial SCM using the preamble, the training sequence, or the RS signal and a channel estimation result; and
  applying time-domain sinc type weighting to the initial SCM and estimating an SCM.

16. The SCM estimation method according to claim 15, wherein the estimating of the initial SCM is performed by Formula 1 (a case of using the preamble or the training sequence of the received OFDM symbol) or Formula 2 (a case of using the RS signal of the received OFDM symbol)

$$R_{k,j}^{II} = (Y_{k,j} - H_{k,j}X_{k,j})(Y_{k,j} - H_{k,j}X_{k,j})^H, 0 \le k \le K-1 \quad \text{Formula 1}$$

$$R_{k,j}^{II} = \begin{cases} (Y_{k,j} - \hat{H}_{k,j}X_{k,j})^H(Y_{k,j} - \hat{H}_{k,j}X_{k,j}), & k \in S_{RS} \\ 0, & k \notin S_{RS} \end{cases} \quad \text{Formula 2}$$

where $\overline{H}_{k,j}$ represents the initial channel estimation result obtained in the performing of the initial channel estimation, $X_{k,j}$ represents a transmission signal, $Y_{k,j}$ represents a reception signal (the RS signal), $S_{RS}$ represents a set of indices of sub carriers having the RS signal, k represents a sub carrier index, and j an index of an OFDM symbol.

17. The SCM estimation method according to claim 16, wherein in the estimating of the SCM includes, the time-domain sinc type weighting is applied by Formula 3

$$\tilde{S}_k^{(n,m)} = FFT_K\left[\left(\left|\frac{1}{K}\frac{\sin(\pi i V/K)}{\pi i V/K}\right|\right) \cdot (s_i'^{(n,m)})\right] \quad \text{Formula 3}$$

$$= M_k^a \otimes S_k'^{(n,m)}, \text{ where } M_k^a$$

$$= \begin{cases} \alpha_k(=\text{constant}), & |k| \le \frac{V}{2}, \frac{K}{V} > \tau_{max} \text{ or } V < \frac{K}{\tau_{max}} \\ 0, & \text{otherwise} \end{cases}$$

$$= \sum_{l=-V/2}^{V/2} M_k^a \cdot S_{k+l}'^{(n,m)},$$

wherein the sinc type weighting is applied such that the sinc type weighting is applied after frequency-time domain transformation by inverse fast Fourier transform (IFFT), and then time-frequency domain transformation is performed by fast Fourier transform (FFT), which is represented by a first formula in Formula 3 or the time sinc type weighting is applied in a frequency domain using a moving average filter $M_{k^a}$ represented by second and third formulas in Formula 3
  (here, k represents a total of the number of sub carriers, $\tau_{max}$ represents a maximum delay time of a multi-path channel, $$S_k^{(n,m)} = R_k^{II}[n,m], \text{ where } \begin{cases} m, n = 1, \ldots, N \\ k = 0, \ldots, K-1 \end{cases},$$

and $s_i^{(n,m)} = IFFT_K[S_k^{(n,m)}]$ (N represents the number of antennas, and V is a constant deciding a form of a sinc function to which the sinc type weighting is applied)).

18. The SCM estimation method according to claim 17, wherein the estimating of the SCM includes estimating an initial SCM on all sub carriers by interpolating the initial SCM, which is estimated by Formula 2 (a case of using the RS signal of the received OFDM symbol) before Formula 3 is applied, on a frequency axis and a time axis by Formula 4, and applying time-domain sinc type weighting by Formula 5

$$R'^{II}_{N_f \cdot k + \beta_1 \cdot j} = \quad \text{Formula 4}$$

$$R^{II}_{N_{RS_f} \cdot k \cdot j}\left(1 - \frac{\beta_1}{N_f}\right) + R^{II}_{(k+1) \cdot N_{RS_f} \cdot j}\left(\frac{\beta_1}{N_f}\right) : \text{Frequency}$$

$$R''^{II}_{k, N_t \cdot j + \beta_2} = R'^{II}_{k, N_{RS_f} \cdot j}\left(1 - \frac{\beta_2}{N_t}\right) + R'^{II}_{k \cdot (j+1) \cdot N_{RS_t}}\left(\frac{\beta_2}{N_t}\right) : \text{Time}$$

where $\beta_1 = 0, 1, \ldots, N_f - 1, \beta_2 = 0, 1, \ldots, N_t - 1$, $$\hat{R}_k^{II} = \begin{bmatrix} \hat{S}_k^{(1,1)} & \cdots & \hat{S}_k^{(1,N)} \\ \vdots & \ddots & \vdots \\ \hat{S}_k^{(N,1)} & \cdots & \hat{S}_k^{(N,N)} \end{bmatrix}, \text{ where} \quad \text{Formula 5}$$

$$\hat{S}_k^{(n,m)} =$$

$$\begin{cases} FFT_K[d_i \cdot IFFT_K[R_k''^{II}[n,m]]]: \text{Conventional method} \\ \sum_{l=-V/2}^{V/2} M_k^a \cdot R_{k+l}''^{II}[n,m]: \text{Proposed method} \end{cases}$$

* * * * *